United States Patent
Patel

(10) Patent No.: US 12,047,656 B2
(45) Date of Patent: *Jul. 23, 2024

(54) SYSTEMS AND METHODS FOR AGGREGATING RELATED MEDIA CONTENT BASED ON TAGGED CONTENT

(71) Applicant: Rovi Guides, Inc., San Jose, CA (US)

(72) Inventor: Milan Indu Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,203

(22) Filed: Apr. 20, 2023

(65) Prior Publication Data

US 2023/0336834 A1 Oct. 19, 2023

Related U.S. Application Data

(63) Continuation of application No. 17/526,446, filed on Nov. 15, 2021, now Pat. No. 11,665,404, which is a continuation of application No. 16/772,066, filed as application No. PCT/US2017/066437 on Dec. 14, 2017, now Pat. No. 11,206,458.

(51) Int. Cl.
| | |
|---|---|
| H04N 21/482 | (2011.01) |
| H04N 21/442 | (2011.01) |
| H04N 21/466 | (2011.01) |
| H04N 21/488 | (2011.01) |
| H04N 21/8405 | (2011.01) |
| H04N 21/845 | (2011.01) |

(52) U.S. Cl.
CPC ....... *H04N 21/4828* (2013.01); *H04N 21/442* (2013.01); *H04N 21/4668* (2013.01); *H04N 21/4882* (2013.01); *H04N 21/8405* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,668,821 B1 | 2/2010 | Donsbach et al. | |
| 7,761,892 B2 | 7/2010 | Ellis et al. | |
| 8,046,801 B2 | 10/2011 | Ellis et al. | |
| 8,806,000 B1* | 8/2014 | Wattenhofer | G06F 40/143 |
| | | | 709/224 |
| 9,075,498 B1 | 7/2015 | Wiggins et al. | |
| 9,544,650 B1* | 1/2017 | Oztaskent | G06F 16/438 |
| 10,187,677 B1* | 1/2019 | Panchaksharaiah | |
| | | | H04N 21/4532 |
| 11,665,404 B2 | 5/2023 | Patel | |
| 2002/0174430 A1 | 11/2002 | Ellis et al. | |
| 2003/0221541 A1 | 12/2003 | Platt | |

(Continued)

OTHER PUBLICATIONS

International Search Report for International Application No. PCT/US2017/066437, dated Sep. 11, 2018.

*Primary Examiner* — Alexander Q Huerta
(74) *Attorney, Agent, or Firm* — Haley Guiliano LLP

(57) ABSTRACT

Systems and methods are described for a media guidance application (e.g., implemented on a user device) that aggregates related media content, associated with media content selected by a user, by comparing keywords.

20 Claims, 13 Drawing Sheets

(56) References Cited

U.S. PATENT DOCUMENTS

| | | |
|---|---|---|
| 2005/0251827 A1 | 11/2005 | Ellis et al. |
| 2008/0204595 A1 | 8/2008 | Rathod et al. |
| 2008/0256443 A1 | 10/2008 | Li et al. |
| 2009/0178083 A1 | 7/2009 | Carr et al. |
| 2010/0153885 A1 | 6/2010 | Yates |
| 2010/0162172 A1 | 6/2010 | Aroner |
| 2013/0060723 A1 | 3/2013 | Di |
| 2013/0132982 A1 | 5/2013 | Xue et al. |
| 2013/0298038 A1* | 11/2013 | Spivack .............. H04L 67/1076 715/753 |
| 2014/0195557 A1* | 7/2014 | Oztaskent .......... H04N 21/4826 707/769 |
| 2017/0251259 A1* | 8/2017 | Klappert ............ H04N 21/4826 |
| 2017/0324987 A1* | 11/2017 | Tseng ................. H04N 21/4756 |
| 2018/0359536 A1 | 12/2018 | Ward |
| 2019/0087502 A1* | 3/2019 | Ardhanari ......... H04M 1/72469 |
| 2019/0132637 A1* | 5/2019 | Yelton .................... G06F 16/40 |
| 2021/0084369 A1* | 3/2021 | Neumeier .......... H04N 21/2353 |
| 2022/0182728 A1 | 6/2022 | Patel |

\* cited by examiner

SYSTEMS AND METHODS FOR AGGREGATING RELATED MEDIA CONTENT BASED ON TAGGED CONTENT

CROSS-REFERENCE TO RELATED APPLICATIONS

This application is a continuation of U.S. patent application Ser. No. 17/526,446, filed Nov. 15, 2021, which is a continuation of U.S. patent application Ser. No. 16/772,066, filed Jun. 11, 2020, now U.S. Pat. No. 11,206,458, which is a national stage application under 35 U.S.C. § 371 of International Application PCT/US2017/066437, filed Dec. 14, 2017, which are hereby incorporated by reference herein in their entireties.

BACKGROUND

The amount of media available to users in any given media delivery system can be substantial. Users simply have no time to watch all available media from all available sources in order to view the specific content of their choosing. Moreover, if users wish to view only a portion of content (e.g., a news broadcast on a particular topic), the users must sit through all of the content until the specific portion is shown. In particular, a user may be interested in a portion of content and may desire to view only content specifically associated with the portion (e.g., news updates or previous developments on the particular news topic) at a convenient time. Consequently, many users desire a form of media guidance through an interface that allows users to tag content and efficiently navigate media selections related to the tagged content.

SUMMARY

Accordingly, systems and methods are disclosed herein for a media guidance application (e.g., implemented on a user device) that aggregates related media content based on content selected by a user. For example, a user may select a news story while viewing a news channel, to receive updates about the news story. The media guidance application may determine keywords that represent the news story selected by the user, and search for news updates matching the keywords. The media guidance application may also search for past news stories associated with the news story selected by the user, to ultimately generate an intuitive user interface (e.g., timeline) that allows the user to access content associated with the user's selection. Generating the aggregated media content associated with user tagged content allows users to view the specific content of their choosing without having to watch all available media from all available sources. Moreover, as the media guidance application aggregates portions of related content (e.g., news updates and summaries) from different content sources (e.g., news channels), users no longer need to sit through an entire media asset until the specific portion that the users wish to view is shown. Likewise, users no longer need to manually search for old portions of content (e.g., past news reports) associated with the particular topic of interest.

Consider a situation in which a user is viewing a news report about a bank robbery on FOX News. Based on his/her interest, the user may choose to tag the story via the media guidance application. The media guidance application may receive a first user selection of a first media content object. The first media content object may be the video stream of the news report. The media guidance application may also receive an option representing a type of information update related to the first media content object. For example, the media guidance application may receive an option such as police investigations or court cases. This type of information update may represent an aspect of the story that the user is interested in (e.g., police investigations may deal with crime scene analysis and court cases may deal with any court matters once the robber is caught).

The media guidance application may extract a first plurality of keywords associated with the first media content object and that corresponds to the type of information update. For example, the first plurality of keywords may be extracted by the media guidance application from the metadata of the media content object (e.g., video of news story), subtitles, audio, and text on the screen. The keywords may include "robber," "Citibank," "stolen," "Manhattan," "Broadway," "October," "money," etc.

The media guidance application may measure a time period since a release time of the first media content object. In response to determining that the time period exceeds an update period associated with the type of information, the media guidance application may monitor a plurality of content sources for a second media content object that is associated with a second plurality of keywords that includes some of the first plurality of keywords. For example, the media guidance application may determine that the media content object (e.g., video of news story) was broadcasted on FOX News on Monday Oct. 16, 2017 at 5:00 pm. Based on the type of information update, the media guidance application may set an update period. Suppose that the type of information update is associated with court cases. The media guidance application may set the update period to every three months because court case developments are not frequent. The media guidance application may measure a time period since the release time of the first media content object (e.g., Oct. 16, 2017 at 5:00 pm) and after three months (e.g., Jan. 16, 2018 at 5:00 pm) determine that the time period exceeds the update period. The media guidance application may then monitor a plurality of content sources (e.g., news channels) for a second media content object (e.g., video of a news story update). The media guidance application may extract a second plurality of keywords from the second media content object. These keywords may include "robber," "Manhattan," "Broadway," "Citibank," "October," "trial," "judge," and "guilty." The second plurality of keywords may include some of the first plurality of keywords. In this example, the media guidance application may determine that "robber," "Manhattan," "Broadway," "Citibank," and "October" appear in both pluralities of keywords.

In response to determining that an amount of the first plurality of keywords included in the second plurality of keywords is less than a threshold, the media guidance application may store the second media content object, wherein the threshold represents media content objects with common subject matter updated with new information. The threshold may be a quantitative or qualitative value that is used to determine whether the second media content object offers new information, or is too similar to the first media content object. For example, the media guidance application may set the threshold to be a percentage of similar keywords (e.g., 60%). Upon determining that the second media object has common subject matter, the media guidance application may note that out of 10 unique words, the two pluralities share five keywords (e.g., 50%). The media guidance application may determine that this value is less than the threshold. Thus, the media guidance application may store the second media content object.

In some aspects, the media guidance application may receive a first user selection of a first media content object. Suppose that the user is viewing a news report on CNN News about Hurricane Maria hitting Puerto Rico. The media guidance application may allow the user to tag the story. Based on his/her interest, the user may end up tagging the story. The media guidance application may receive these selections associated with the first media content object (e.g., video clip of the news story).

Based on a type associated with the first media content object, the media guidance application may generate for display a plurality of options, each representing an aspect of subject matter of the first media content object. For example, the media guidance application may generate, for display, types of information updates such as economic effects, political aftermath, and social impact. Each type of information update is associated with a unique theme. Furthermore, each option may be associated with a set of keywords predetermined by the media guidance application. For example, economic effects may deal with the impact of the hurricane on businesses and trade. Associated keywords of economic effects may include "economy," "business," "money," etc. Political aftermath may encompass politicians and laws associated with the hurricane. Associated keywords of political aftermath may include "Donald Trump," "President," "laws," "government," etc. Social impact may encompass donation efforts, relief, and recovery updates of various communities. Associated keywords of social impact may be "rescue," "community," "donation," "families," etc.

In some embodiments, the first media content object is a news story about a criminal investigation, wherein the first option is associated with a first aspect of subject matter, wherein a second option of the plurality of options is associated with a second aspect of subject matter. For example, the first aspect of subject matter represents content related to a victim of the criminal investigation, and the second aspect of subject matter represents content related to a trial of a suspect of the criminal investigation.

In response to receiving a second user selection of a first of the plurality of options, the media guidance application may extract, in accordance with the selected first option, a first plurality of keywords associated with the first media content object. For example, the user may select the social impact option. In response, the media guidance application may begin the process of extracting keywords from the media content object.

The media guidance application may extract keywords in different ways. For example, the media guidance application may retrieve, from the content provider/source, metadata associated with the media content object, to determine keywords. The media guidance application may also extract subtitles from the media content object. The media guidance application may utilize natural language processing and speech recognition to determine text from audio associated with the media content object. The media guidance application may also utilize computer vision processes (e.g., segmentation, edge detection) to identify objects on the screen. For example, the media guidance application may identify images of the hurricane on the screen and classify "hurricane" as a keyword. Similarly, the media guidance application may parse images of text on the screen such as "Breaking News: Hurricane Maria hits Puerto Rico," convert to text, and classify "Hurricane Maria" and "Puerto Rico" as keywords. Suppose that the media guidance application utilizes all methods listed above to extract keywords. The first plurality of keywords, as determined by the media guidance application, may thus include "Hurricane Maria," "Puerto Rico," "hurricane," "devastating," and "damage."

The media guidance application may then identify an update period associated with the selected first option. Options may be associated with update periods (e.g., unit of time) based on the frequency of occurrences of updates in an option. For example, suppose the media guidance application provides three options: economic effects, political aftermath, and social impact. Economic effects, the first option, may have a monthly update period. This is because changes in the economy may be slow and long term. Political aftermath, the second option, may have an update period of five hours. This may be to track political press conferences and statements. Social impact, the third option, may have an hourly update period. This is because stories of rescue missions, donations, and relief efforts occur frequently after a natural disaster. Based on the user's selected option, social impact, the media guidance application may set the update period associated with the first media content object as hourly.

The media guidance application may measure a time period since a release time of the first media content object. The release time is the time at which the first media content object was transmitted by the content provider. For example, the release time for a news broadcast about Hurricane Maria hitting Puerto Rico may be Oct. 2, 2017 at 5:00 pm. Suppose that the user chooses to tag the news broadcast. The media guidance application may identify the news broadcast video clip as the first media content object and begin measuring time from the release time (e.g., incrementing by a unit of time).

In response to determining that the time period exceeds the update period, the media guidance application may simultaneously monitor a plurality of content sources for a second media content object that is associated with a second plurality of keywords that includes some of the first plurality of keywords. The media guidance application may compare the measured time period with the update period whenever the media guidance application increments the time period (e.g., every minute). In this case, for example, the media guidance application may determine that the time period exceeds the update period at 6:00 pm on Oct. 2, 2017 because the update period is hourly. The media guidance application then may reset the measured time period and restart the measuring process.

The media guidance application may extract the second plurality of keywords associated with the second media content object. Suppose that at 6:00 pm, the media guidance application monitors and detects a second media content object. The media guidance application may extract a second plurality of keywords from the second media content object. These keywords, as determined by the media guidance application using computer vision and natural language processing, may include "Hurricane Maria," "Puerto Rico," "rescue," "citizen," and "damage."

In response to determining that an amount of the first plurality of keywords included in the second plurality of keywords is less than a threshold, the media guidance application may store the second media content object, wherein the threshold represents media content objects with common subject matter updated with new information. The media guidance application may first determine whether the second media content object has common subject matter with the first media content object. In some embodiments, the threshold may have an upper level and a lower level. The upper level represents the maximum allowable amount of the first plurality of keywords that can be included in the second plurality of keywords. In contrast, the lower level represents the minimum allowable amount of the first plurality of keywords that can be included in the second plurality of keywords. An allowable amount is the amount that the media guidance application determines sufficient for storing a media content object.

The media guidance application may determine that the second media content object has common subject matter with the first media content object if the lower level of the threshold is met. For example, the first plurality of keywords may include "Hurricane Maria," "Puerto Rico," "hurricane," "devastating," and "damage." The second plurality of keywords may include "Hurricane Maria," "Puerto Rico," "rescue," "citizen," and "damage." Collectively, both pluralities contain seven unique words. The second plurality of keywords shares three words with the first plurality of keywords. In this example, the media guidance application may set the lower level of the threshold to 30%. In order to be considered common subject matter with the first media content object, the media guidance application therefore requires at least 30% of the words to be shared with the first plurality of keywords. In this case, 60% of the second plurality of keywords are also included in the first plurality of keywords. Based on this, the media guidance application may determine that the second media content object has common subject matter with the first media content object.

In response to determining that the second media content object has common subject matter with the first media content object, the media guidance application may determine that the second plurality of keywords also satisfies the upper level of the threshold. The media guidance application may set the upper level to 80%. Therefore, if the second plurality of keywords shares 80% of its keywords with the first plurality of keywords, the media guidance application may determine not to store the second media content object (e.g., the second media content object is too similar to the first media content object and may be the same news story). In the example given, the shared keywords in the second plurality of keywords only account for 60% of the total keywords in the second plurality. Therefore, the media guidance application may determine that the second plurality of keywords satisfies the upper level of the threshold.

In some embodiments, the media guidance application may determine whether the second plurality of keywords corresponds to the option keywords. As discussed previously, option keywords are predetermined by the media guidance application and are associated with the user selected options (generated by the media guidance application). Option keywords may be words that universally describe a topic. For example, the topic of social impact may be associated with option keywords such as "rescue," "community," "citizen," "families," etc. The media guidance application may analyze media on the Internet associated with a "social impact" theme in order to derive these option keywords. The media guidance application may set an option threshold which represents the minimum amount of option keywords that need to be included in the second plurality of keywords. Suppose that the media guidance application determines that the second media content object is a unique follow-up video clip of the user's tagged video clip (e.g., news update to Hurricane Maria news story). If the media guidance application determines that the second plurality of keywords does not satisfy the option threshold, the media guidance application may not store the second media content object because the second media content object is not associated with the user's selected option. For example, the media guidance application may set the option threshold to 15%. If the second plurality of keywords includes "Hurricane Maria," "Puerto Rico," "rescue," "citizen," and "damage," the media guidance application may determine that "rescue" and "citizen" are option keywords of the option, social impact.

Upon determining that the second plurality of keywords satisfies the lower, upper, and option thresholds, the media guidance application may store the second media content object in memory. This signifies that the second media content object (e.g., video clip) covers the same story that the user wished to tag (e.g., contained in first media content object). Furthermore, the second media content object is unique and adds additional information to the story. Lastly, the second media content object corresponds to the information type requested by the user.

In some embodiments, the media guidance application may search the plurality of content sources for media content objects that include less than all of the first plurality of keywords and that are associated with a release time that precedes the first time. The release time is the time a media content object is transmitted by a content provider. For example, the content provider may be FOX. The media content object may be a story segment on FOX News which is transmitted on FOX. Suppose that the first time the user selects a first media content object is on Monday, Oct. 9, 2017. The media guidance application may search for media content objects with release times before the first time on the Internet or databases of stored media from the content provider. For example, the media guidance application may retrieve previous news stories related to Hurricane Maria from the FOX News website.

In some embodiments, the media guidance application receives, as the first user selection, input from a user tagging a news story of interest. The media guidance application may generate keywords associated with the news story and categorize the keywords into a plurality of categories. For example, the media guidance application may receive a user selection to tag a news story about Hurricane Maria. The media guidance application may generate, using computer vision and natural language models, keywords associated with the news story such as "Hurricane Maria," "hurricane," "Puerto Rico," "rescue," "family," "house," "girl," etc. The media guidance application may categorize the keywords using data analytics processing (e.g., clustering, classification), to determine a plurality of categories. The plurality of categories represents recurring themes or concepts. In some embodiments, the media guidance application may transcribe the news report and analyze all words to generate the plurality of categories. Suppose that the plurality of categories includes "devastation," "social impact," and "rescues." These categories represent a classification of the news report. Thus, the news report can be a part of stories about devastation, rescues and social impact. The media guidance application may compare each of the plurality of categories to the aspect of subject matter corresponding to the first option. Revisiting the previous example, the first option is associated with social impact. The media guidance application may compare the term "social impact" with each category in the plurality of categories. The media guidance application may then identify the first plurality of keywords in response to determining that a category associated with each of the first plurality of keywords corresponds to the aspect of subject matter. For example, the media guidance application may determine the first option corresponds to the category "social impact." In response, the media guidance application may identify the generated keywords as the first plurality of keywords.

In some embodiments, in response to determining that the amount of the first plurality of keywords included in the second plurality of keywords is less than the threshold, the media guidance application may determine a type of update associated with the second media content object. For example, the media guidance application may determine that the second plurality of keywords shares common subject matter with the first plurality of keywords, and is unique because the second plurality of keywords contains an amount of the first plurality of keywords that is less than the threshold. The media guidance application may select an alert type based on the type of update. For example, the media guidance application may create an overlay that informs that user that a second media content object has been detected and allows the user to access the second media content object. In some embodiments, the media guidance application may generate a media playlist by combining the first media content object and the second media content object. The media guidance application may generate a timely alert (e.g., daily, weekly, monthly) by therefore aggregating all detected media content objects in a list and displaying the list to the user in chronological order.

In some embodiments, the media guidance application may determine a current season of a show in which the user has expressed interest. The media guidance application may refer to a user profile associated with the user to determine a viewing schedule. The viewing schedule may indicate a show that the user views on a regular basis. For example, the user may watch "Game of Thrones." The media guidance application may extract metadata associated with "Game of Thrones" from the viewing history of the user. The metadata may indicate that the user is viewing season 7 of the show. The media guidance application may retrieve information associated with "Game of Thrones" from the Internet, such as the current season. Suppose that the user determines that the current season is 7. The media guidance application may determine that the user is viewing episodes from the current season. The media guidance application may then determine an end time of the current season. For example, the media guidance application may determine, using the Internet, that the current season has two episodes remaining and that the final episode of the season will be broadcasted on Sunday Aug. 27, 2017. In response, the media guidance application may delay notifying the user about the second media content object until the end time of the current season. For example, the media guidance application may generate an alert using the alert type immediately after the broadcast of the final episode of the current season, or at a set time after the final episode (e.g, one hour after, one day later, etc.). The user may set the alert frequency, alert type, and alert schedule in his/her user profile.

The media guidance application may monitor the plurality of content sources for a third media content object that is associated with a third plurality of keywords that includes some of the first and second plurality of keywords. For example, the media guidance application may detect a third news story pertaining to Hurricane Maria about a roof of a hospital being blown away. The media guidance application may determine that the third plurality of keywords include "Hurricane Maria," "hurricane," "roof," "hospital," "patients," and "evacuation." As seen in the previous examples, the first and second pluralities of keywords include "Hurricane Maria" and "hurricane."

Suppose that the threshold for an amount of matching keywords in each plurality of keywords is 80%. The media guidance application may determine that only two words of the third plurality of keywords are also in the first and second pluralities of keywords. The two words account for 33% of the third plurality of keywords. The media guidance application may therefore determine that an mount of the first and second plurality of keywords included in the third plurality of keywords is less than the threshold and may store the third media content object. The media guidance application may also identify times associated with each of the first, second and third media content objects. The times associated with each of the media content objects may be the times of transmission from the content provider and may be retrieved, by the media guidance application, from the Internet or media content object metadata. For example, the first, second and third media content objects may have been transmitted on a Monday, Tuesday and Wednesday on FOX News at 8:00 pm, respectively. The media guidance application may then generate, for display, a timeline representing the identified times and the first, second, and third media content objects, wherein the timeline includes indicators of types of updates associated with the first, second and third media content objects. The user can therefore access each news story in an efficient interface sorted by broadcast time.

In some embodiments, the media guidance application may determine a characteristic of the first media content object and generate a recommendation of a media asset associated with the characteristic. The characteristic may be a theme associated with the first media content. For example, a characteristic can be "criminal activity," "weather alert," "natural disaster," "sports event," etc. For example, the media guidance application may determine, based on the keywords associated with the first media content object, that the characteristic is "natural disaster" because the keywords include references to Hurricane Maria, a natural disaster. The media guidance application may then recommend other news stories about similar events (e.g., natural disasters) such as earthquakes and tornados.

In some embodiments, the media guidance application may search a first plurality of previous release times associated with a first set of content corresponding to a first aspect of subject matter. For example, the first aspect of the subject matter may be the social impact of Hurricane Maria. The first set of content may therefore include news stories about the hurricane's social effect on Puerto Rico and communities attempting to heal. The first plurality of previous release times may be associated with each respective story (e.g., the first news story has a first release time, the second news story has a second release time, etc.). The media guidance application may determine a first average duration between each of the first plurality of previous release times. Suppose that the first story has a release time of 9:00 pm on Monday and the second story has a release time of 9:00 pm on the following Tuesday. The media guidance application may determine that there are 24 hours between these two release times. The media guidance application may then determine the amount of time between the second release time and a third release time. This process may continue until all media content objects in the first set of content are accounted for. The media guidance application may then determine the average duration between all release times.

The media guidance application may further store the first average duration, as a first value for a first update period associated with the first aspect of subject matter. For example, the media guidance application may store 24 hours as the update period for content associated with Hurricane Maria's aftermath if the average duration between release times is 24 hours. This represents the amount of time the media guidance application waits before monitoring for an additional media content object. The media guidance application may then search a second plurality of previous release times associated with a second set of content corresponding to a second aspect of subject matter. The media guidance application may also determine a second average duration between each of the second plurality of previous release times, and store the second duration, as a second value for a second update period associated with the second aspect of subject matter. For example, the media guidance application may repeat the process of determining an average duration between release times for a second aspect of subject matter such as the effect of Hurricane Maria on the economy. Since economic effects are not always immediate, the media guidance application may determine a greater average duration between these release times. In fact, it is possible that the media guidance application may determine that the second release time pertaining to the economic effect of Hurricane Maria is one month after the first release time. The media guidance application may then select one of the first and second update periods as the identified update period, based on the aspect of subject matter corresponding to the selected first option. In the example previously given, the user selects the social impact option. Therefore, the update period may be set according to the first aspect of subject matter, which is associated with the social impact of Hurricane Maria.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
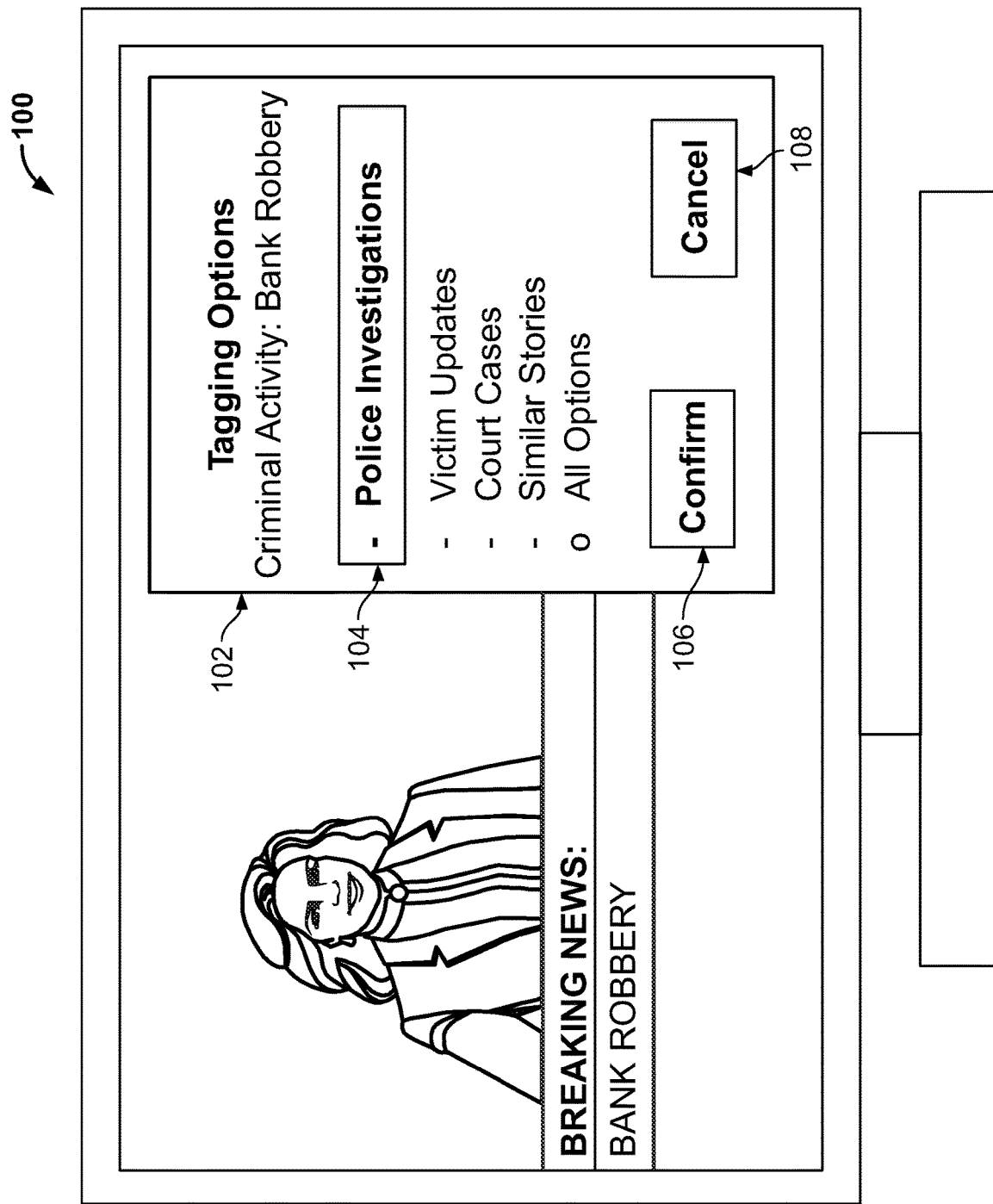
FIG. 1 is an illustrative example of a display screen that allows the user to tag a first media content object and select an option representing an aspect of subject matter of the first media content object, in accordance with some embodiments of the disclosure.

Systems and methods are disclosed herein for a media guidance application (e.g., implemented on a user device) that aggregates related media content based on content selected by a user. For example, a user may select a news story while viewing a news channel, to receive updates about the news story. The media guidance application may determine keywords that represent the news story selected by the user, and search for news updates by comparing keywords. The media guidance application may also search for past news stories associated with the news story selected by the user, to ultimately generate an intuitive user interface (e.g., timeline) that allows the user to access content associated with the user's selection. Generating the aggregated media content associated with user tagged content allows users to view the specific content of their choosing without having to watch all available media from all available sources.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Suppose that a user is viewing a news report about a bank robbery on CNN News. Based on his/her interest, the user may choose to select (e.g., tag) the story via the media guidance application. Upon receiving a request to tag the news story the user is currently watching, the media guidance application may identify (e.g., via control circuitry 604 (discussed in FIG. 6 description)) the video clip of the news story as the first media content object. A media content object (also referred to as "media object") may be any media that presents information to a user (e.g., video, audio, text, game, etc.).

The media guidance application may then initiate a process to determine a class of the first media content object, wherein the class of the media content object represents the general topic of the media content object. For example, news reports about robberies, murders, and assault may share the class "criminal activity." The media guidance application may extract metadata associated with the first media content object. For example, each media content object may be transmitted from the media guidance source 716 (discussed in FIG. 7 description) and the respective metadata may be transmitted from the media guidance data source 718 (discussed in FIG. 7 description). The metadata may include information such as title, transmission time, content provider, genre, description, media type, etc. The media guidance application may determine (e.g., via control circuitry 604 (discussed in FIG. 6 description)) a class of the media content object from the respective metadata, or subtitles, audio, and visuals that may be associated with the media content object. In this case, the description of the media content object may indicate that the media content object is a news story about a bank robbery that happened in New York City. Accordingly, the media guidance application may classify (e.g., via control circuitry 604 (discussed in FIG. 6 description)) the first media content object under the class "criminal activity."

Classifying the first media content object may involve various media processing methods (e.g., speech recognition, computer vision, etc.). For example, the media guidance application may utilize speech recognition to transcribe the audio of the news reporter or extract words from the subtitles associated with the video clip. In response, the media guidance application may analyze the transcription using natural language processing and data analytics (e.g., word count, clustering, classification) to determine a first plurality of keywords that best describe the media content object. Keywords may be words that are frequently mentioned in the media content object or are marked with high importance (e.g., words that appear in the title or in the description of the metadata). In addition, the media guidance application may utilize computer vision to identify words on the frames of the media content object.

Upon determining the first plurality of keywords, the media guidance application may refer to a class database in storage 608 (discussed in FIG. 6 description) that includes information about various classes and their associated keywords. The media guidance application may then determine whether the keywords in the first plurality of keywords are included in the class database. In response to determining that part/all of the first plurality of keywords is in the class database, the media guidance application may identify the class that a majority of the extract keywords are associated with. For example, the first plurality of keywords, as determined by the media guidance application (e.g., via control circuitry 604 (discussed in FIG. 6 description), may include "Manhattan," "bank," "robbery," "money," "gun," "camera," etc. The media guidance application may determine that four of the six keywords are found in the class "criminal activity." Therefore, the media guidance application may determine that the class of the first media content object is "criminal activity."

Furthermore, the class database may also include options with aspects of subject matter. These options allow the user to focus on a specific aspect of the media content object. Therefore, all news updates that the media guidance application stores are tailored to the user's preference. For example, the class "criminal activity" may be associated with aspects of subject matter such as police investigations, victim updates, and court cases, as indicated by the class database. This is applicable to various media types. For example, if the media content object is a song, the media guidance application may determine that the class of the song is the song's music genre (e.g., R&B, rap, electronic, etc.). The aspects of subject matter may therefore include the instruments involved, the artist, the language, etc. If the user is interested in the artist, the media guidance application may monitor for songs associated with the artist. Upon determining the options associated with the class of the first media content object, the media guidance application may generate an overlay with various options for the user to select.

FIG. 1 is an illustrative example of a display screen 100 that allows the user to tag a first media content object and select an option representing an aspect of subject matter of the first media content object, in accordance with some embodiments of the disclosure.

Overlay 102 may serve as the user input interface 610 on display 612 (e.g., discussed in FIG. 6) and may provide tagging options to the user. For example, overlay 102 may include information such as the class of the media content object. The media guidance application may retrieve, from the metadata of the first media content object, the title of the first media content object. The media guidance application may also utilize computer vision (e.g., edge detection and classification) to determine the title of the first media content object, based on the content on the screen. For example, the screen may display a banner stating, "Breaking News: Local Bank Robbery." The media guidance application may determine that the title is "Local Bank Robbery," because "Breaking News" is only a preamble to news updates. Overlay 102 may thus include title information as well. Overlay 102 may additionally list all options for the user that are associated with the class of the first media content object. For example, overlay 102 lists police investigations, victim updates, court cases, similar stories, and all options as selectable options.

Option selector 104 is a movable marker that the user may use to choose the option(s) he/she may be interested in. For example, the user may be interested in police investigations associated with the bank robbery. Therefore, the user may select the police investigations. In some cases, the user may be interested in more than one option and may select multiple options such as police investigations and victim updates. In some cases, the user may choose to select all of the options listed. The user may confirm the selections using button 106, or cancel the tagging process using button 108. Suppose that the user selects the option, police investigations.

Upon receiving the user's selections of the options associated with the class of the first media content object, the media guidance application may identify an update period associated with the first option. Options may be associated with update periods (e.g., units of time) based on the frequency of occurrences of updates in an option. The process for deriving the update period is discussed in the description of FIG. 12. Suppose that the media guidance application provides three options: police investigations, victim updates, and court cases. Court cases, the third option, may have a monthly update period. This is because reports on court cases may be infrequent. Police investigations and victim updates, the first and second options, may each have hourly update periods. This is because stories of police searches, victim interviews, and clues may be transmitted frequently after the crime. The media guidance application may store the update period in a subject matter database. For example, based on the user's selected option, police investigations, the media guidance application may set the update period associated with the first media content object as hourly and may store the value in the subject matter database under a section "police investigations."

The media guidance application may then measure a time period since a release time of the first media content object. The release time is the time at which the first media content object is transmitted by the content provider. For example, the release time for a news broadcast about the bank robbery in Manhattan may be Oct. 7, 2017 at 5:00 pm. Suppose that the user chooses to tag the news broadcast. The media guidance application (e.g., via control circuitry 604 (discussed in FIG. 6 description)) may identify the news broadcast video clip as the first media content object and begin measuring time from the release time (e.g., incrementing by a unit of time).

Once the update period has passed after the release time, the media guidance application may simultaneously monitor a plurality of content sources for a second media content object (e.g., a video clip of a news update). The plurality of content sources may include different television channels, online video sources, radio stations, podcasts, news articles, etc. For example, the media guidance application may monitor a morning news show broadcasted on a radio station. The news show may mention that the robber has been identified by the police after an investigation involving surveillance cameras and fingerprints. Suppose that the update period is hourly. The news segment on the radio station may be broadcasted on Oct. 8, 2017 at 8:00 am. Thus, the media guidance application may identify the audio clip of the news segment as the second media content object. The media guidance application may then extract a second plurality of keywords associated with the second media content object, using the keyword extraction methods discussed previously. In this particular case, the media guidance application may exclusively employ speech recognition to transcribe the audio of the news segment, and then utilize natural language processing to determine keywords.

The media guidance application may then determine whether the second media content object shares common subject matter with the first media content object by comparing the first plurality of keywords with the second plurality of keywords. The media guidance application may use predetermined thresholds to evaluate whether there is enough similarity between the first and second pluralities. A threshold may be a quantitative (e.g., percentage, fraction) or qualitative (e.g., "similar," "not similar") value that represents the boundary that must be satisfied. For example, the media guidance application may retrieve a lower level of the threshold. The lower level of the threshold may be the minimum amount of keywords from the first plurality of keywords that must be included in the second plurality of keywords. Suppose that the second plurality of keywords includes "Manhattan," "bank," "robbery," "mask," "gun," "camera," and "fingerprints." The media guidance application (via control circuitry 604 (discussed in FIG. 6 description)) may determine that the second media content object has common subject matter with the first media content object if the lower level of the threshold is met.

As mentioned previously, the first plurality of keywords may include "Manhattan," "bank," "robbery," "money," "gun," and "camera." Collectively, both pluralities contain eight unique words. The second plurality of keywords shares five words with the first plurality of keywords. In this example, the media guidance application may retrieve the lower level of the threshold from memory (e.g., storage 608 (discussed in FIG. 6 description)) and determine that the lower level of the threshold is 30%. In order to be considered common subject matter with the first media content object, the media guidance application therefore requires at least 30% of the words to be shared with the first plurality of keywords. In some embodiments, if the user selects the option "similar stories" in FIG. 1, the media guidance application may set the lower level of the threshold to a smaller value (e.g., 20%) to detect media content objects that are similar, but not perhaps associated with the exact same news story. In this case, approximately 72% of the second plurality of keywords are also included in the first plurality of keywords. Based on this, the media guidance application may determine that the second media content object has common subject matter with the first media content object.

The media guidance application may then determine that the amount of the first plurality of keywords included in the second plurality of keywords is less than an upper level of the threshold. The upper level of the threshold may be the maximum amount of keywords present in both the first and second plurality. If the amount exceeds the upper level of the threshold, the media guidance application may determine that the second media content object is too similar to the first media content object (e.g., same story or a rerun). Suppose that the upper level of the threshold is 80% and the amount, as discusses previously, is 72%. The media guidance application may determine that the second media content object features new information associated with the first media content object.

In some embodiments, the media guidance application may determine that the amount of option keywords included in the second plurality of keywords is greater than an options threshold. The options threshold represents the minimum amount of option keywords, which are predetermined keywords associated with each option of a class, that need to be included in the second plurality of keywords. The process of determining the option keywords is further discussed in the description of FIG. 10. The media guidance application may retrieve the option threshold (e.g., set to 10%) from memory (e.g., storage 608 (discussed in FIG. 6 description)). The option, police investigations, may be associated with option keywords such as "police," "clues," "camera," "witnesses," and "questioning." If the second plurality of keywords includes "Manhattan," "bank," "robbery," "mask," "gun," "camera," and "fingerprints," the media guidance application may determine that "camera" is an option keyword that accounts for approximately 14% of the second plurality of keywords. Therefore, control circuitry 604 may determine that the amount of the option keywords included in the second plurality of keywords is greater than the options threshold.

Once the media guidance application has determined that the second media content object shares common subject matter with first media content object (e.g., based on lower level of the threshold), features new information about the subject matter (e.g., based on the upper level of the threshold), and pertains to a specific aspect of the subject matter (e.g., based on the options threshold), the media guidance application may store the second media content object. Furthermore, the media guidance application may alert the user through a notification on the user's display.

Figure 2:
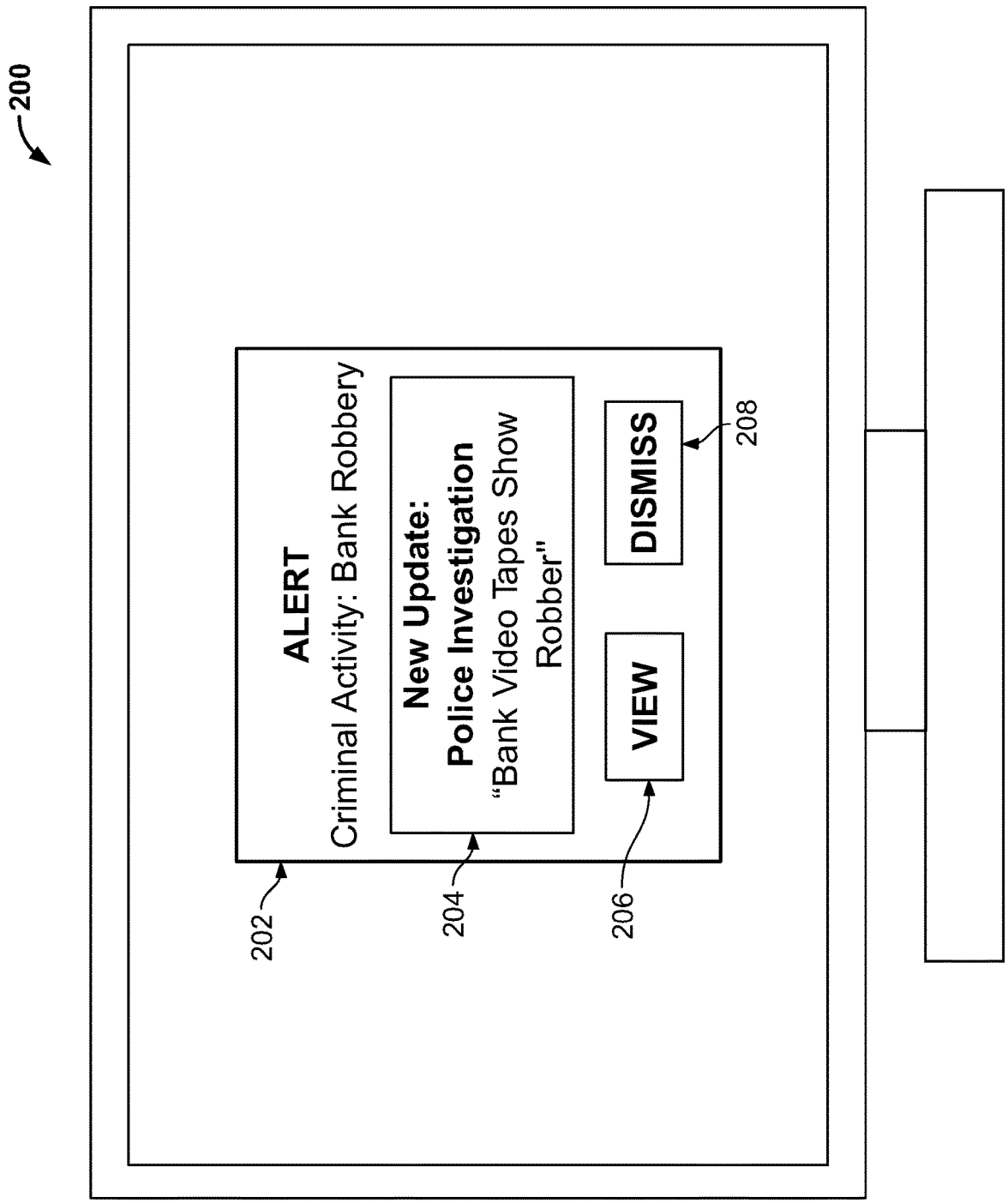
FIG. 2 is an illustrative example of a display screen that alerts the user of a second media content object that has been stored, in accordance with some embodiments of the disclosure.

FIG. 2 is an illustrative example of a display screen 200 that alerts the user of a second media content object that has been stored, in accordance with some embodiments of the disclosure. Overlay 202 informs the user of the class of the first media content object (e.g., "Criminal Activity") and the original title of the first media content object that was tagged (e.g., "Bank Robbery"). This ensures that the user is provided information about the first media content object that he/she tagged, in the event that the user tagged multiple media content objects.

Overlay 204 informs the user of the option that the second media content object is associated with (e.g., police investigations). In addition, overlay 204 lists the title of the second media content object. The title of the second media content object may be retrieved from the metadata associated with the second media content object. In this case, because the second media content object is an audio clip, the associated metadata only may list the name of the news show broadcasted on the radio station. Therefore, the media guidance application may refer to the second plurality of keywords and place the most frequently used words in the title section of overlay 204 (e.g., "Bank Video Tapes Show Robber"). The user may select to access the second media content object by selecting button 206. In contrast, the user may select to dismiss the alert by selecting button 208.

In some embodiments, the media guidance application searches the plurality of content sources for media content objects that include less than all of the first plurality of keywords and that are associated with a release time that precedes the first release time. The first release time is the time the first media content object is transmitted (e.g., Oct. 7, 2017 at 5:00 pm). The media guidance application may search for media content objects with release times before the first time on the Internet or databases of stored media from the content provider. For example, the media guidance application may retrieve previous news stories related to the bank robbery from the CNN News website (e.g., news story about suspicious activities near the bank a few days before the robbery). Accordingly, each media content object with a release time that precedes the first release time will be analyzed by the media guidance application (e.g., extract keywords, determine that the media content object shares common subject matter with the first media content object). Suppose that the media guidance application detects a video clip on the CNN News website with a release time of Oct. 1, 2017 at 4:00 pm. The video clip may discuss suspicious activity near the bank that was robbed on Oct. 7, 2017. The media guidance application may identify the video clip as a third media content object and repeat the process previously discussed for determining whether the third media content object is associated with the first media content object (e.g., shares common subject matter, includes new information) using keywords. Upon determining that the third media content object does share common subject matter and features new information, the media guidance application may store the third media content object. It should be noted that when storing media content objects, the media guidance application also stores the release time, class, keywords, and user-selected options associated with the media content object. This information can later be used to generate an intuitive user interface for accessing all media content objects associated with the media content object originally tagged by the user.

Figure 3:
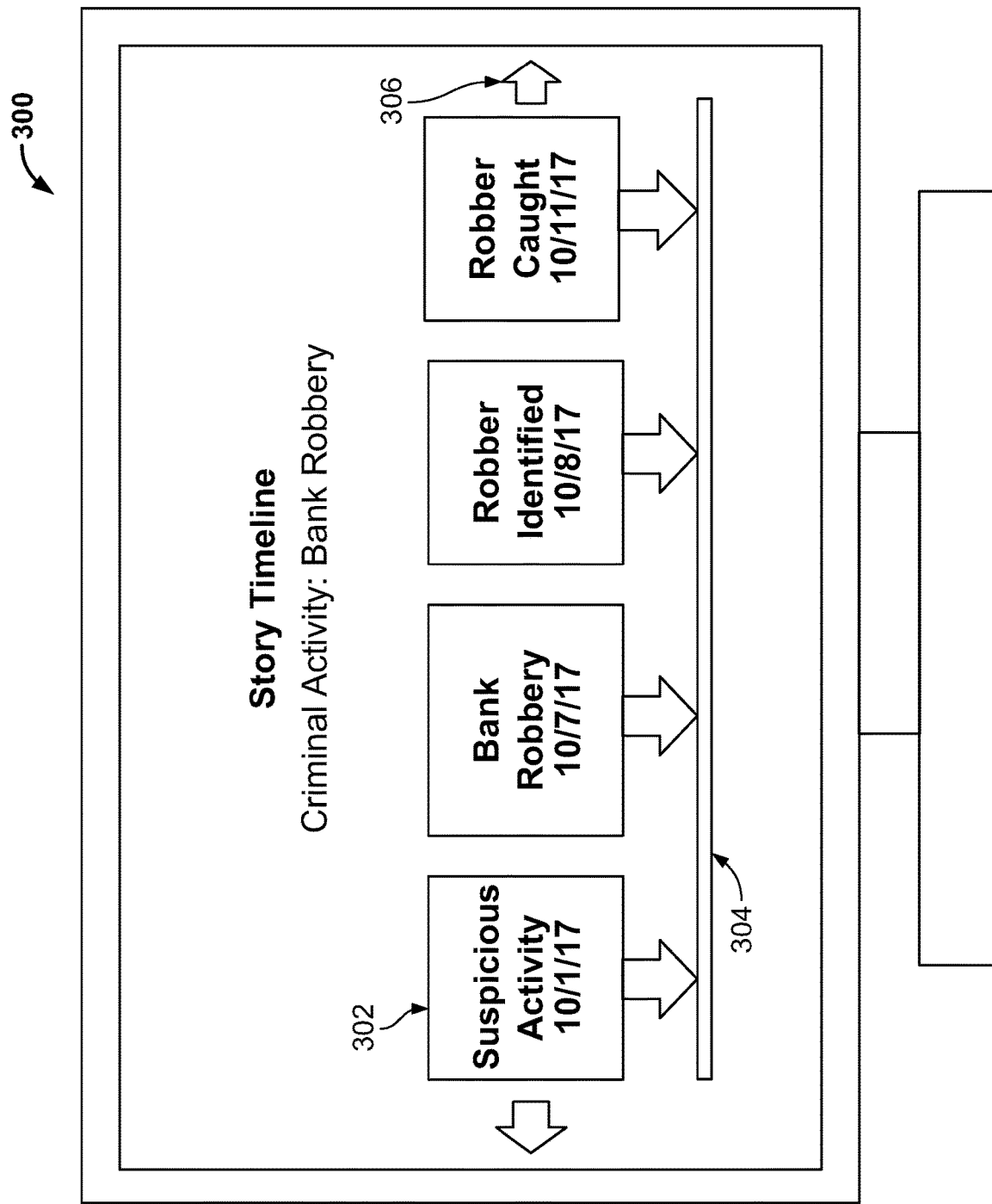
FIG. 3 is an illustrative example of a display screen presenting a timeline of four media content objects ordered based on their respective release times, in accordance with some embodiments of the disclosure.

FIG. 3 is an illustrative example of a display screen 300 presenting a timeline of four media content objects ordered based on their respective release times, in accordance with some embodiments of the disclosure. Media selector 302 indicates the title and the associated release time of the media content object. In some embodiments, if the user has selected multiple options of aspects of subject matter (e.g., police investigations and court cases), media selector 302 may include the option the media content object is associated with. In FIG. 3, four media selectors are depicted, each representing a different media content object. Time tracker 304 represents the range of time in which the media content objects shown in the media selectors were transmitted (e.g., based on release times). The user may scroll through additional media content objects (if any exist), by selecting button 306.

Figure 4:
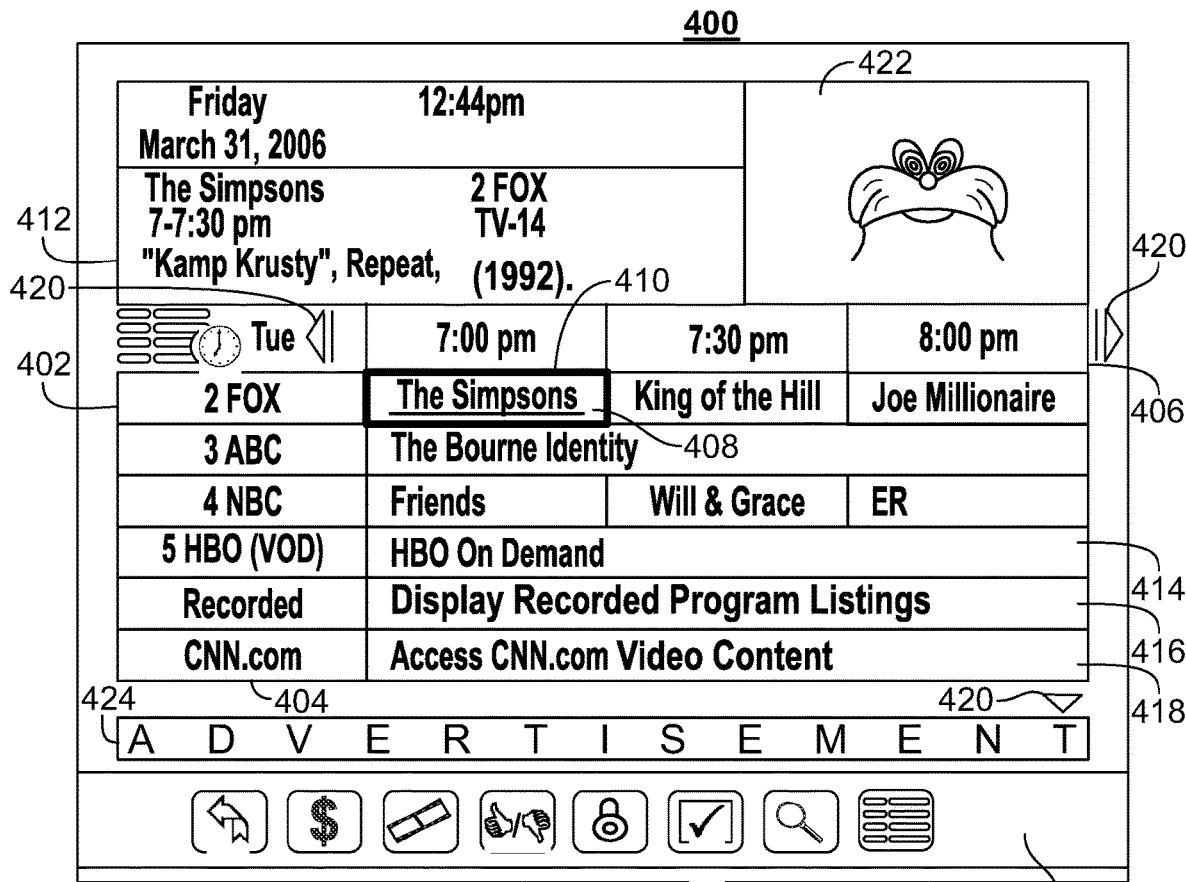
FIGS. 4 and 5 show illustrative examples of display screens generated by a media guidance application in accordance with some embodiments of the disclosure.
Figure 5:
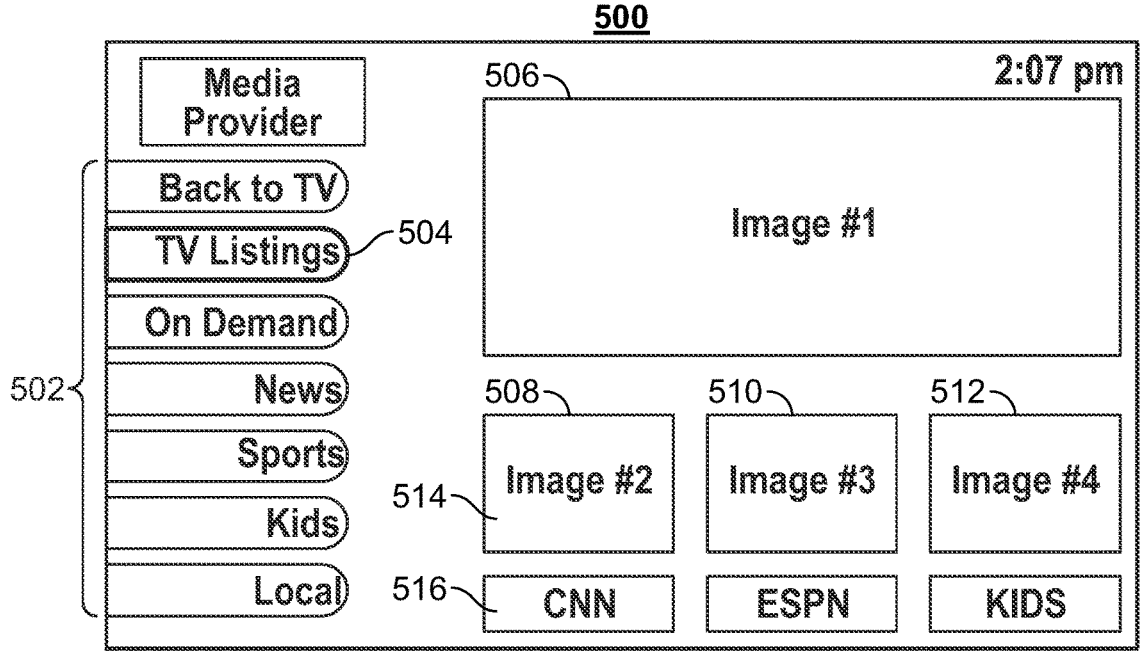

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/ or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
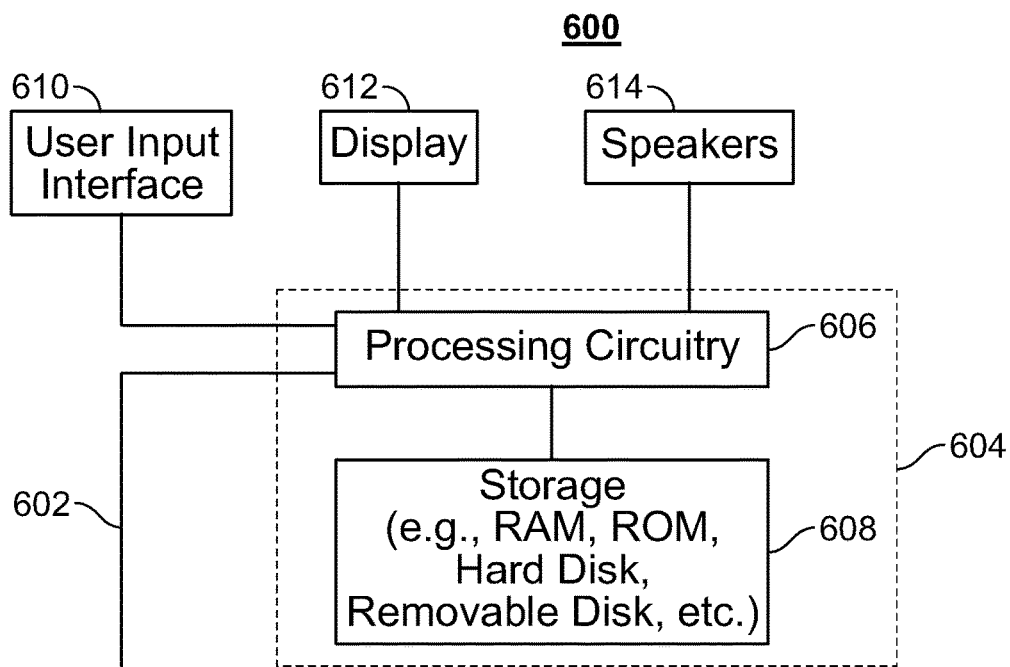
FIG. 6 is a block diagram of an illustrative user equipment device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content.

The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
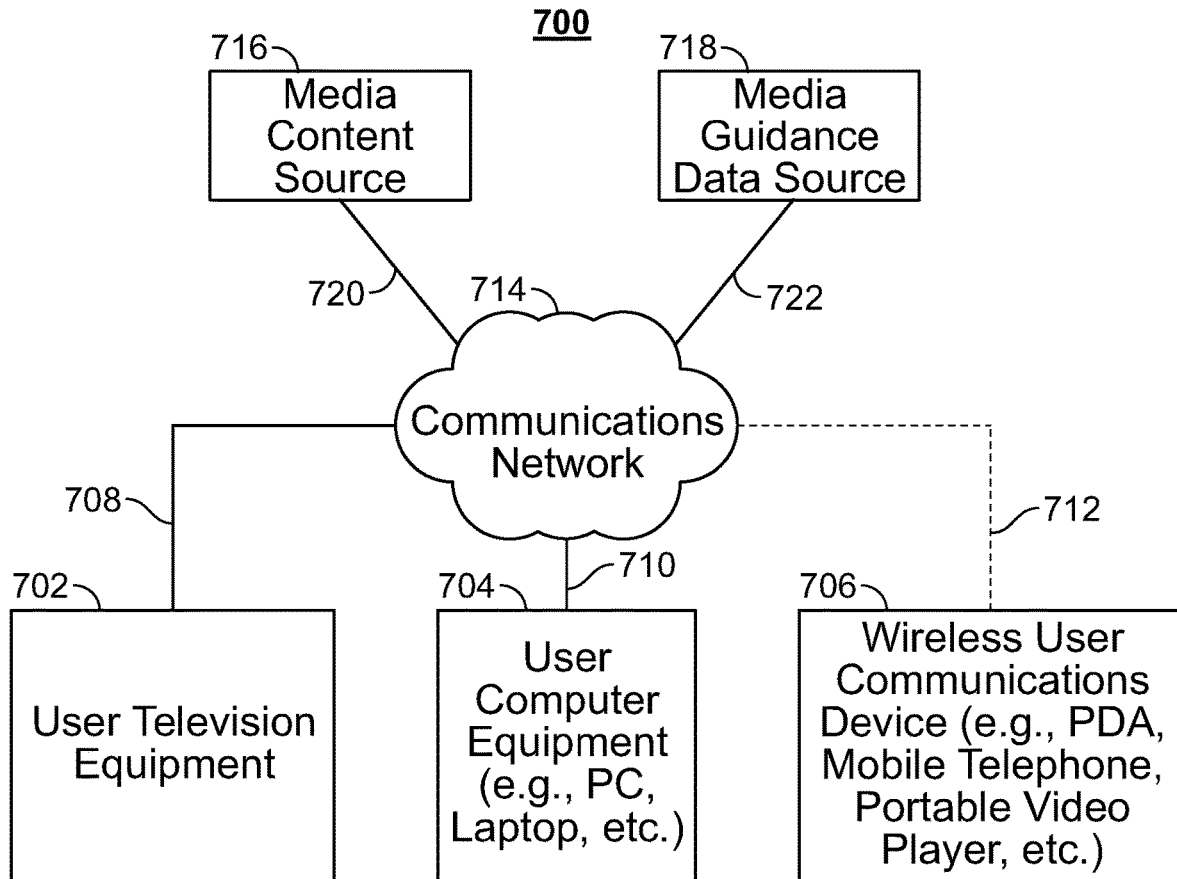
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camedia content objectrders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
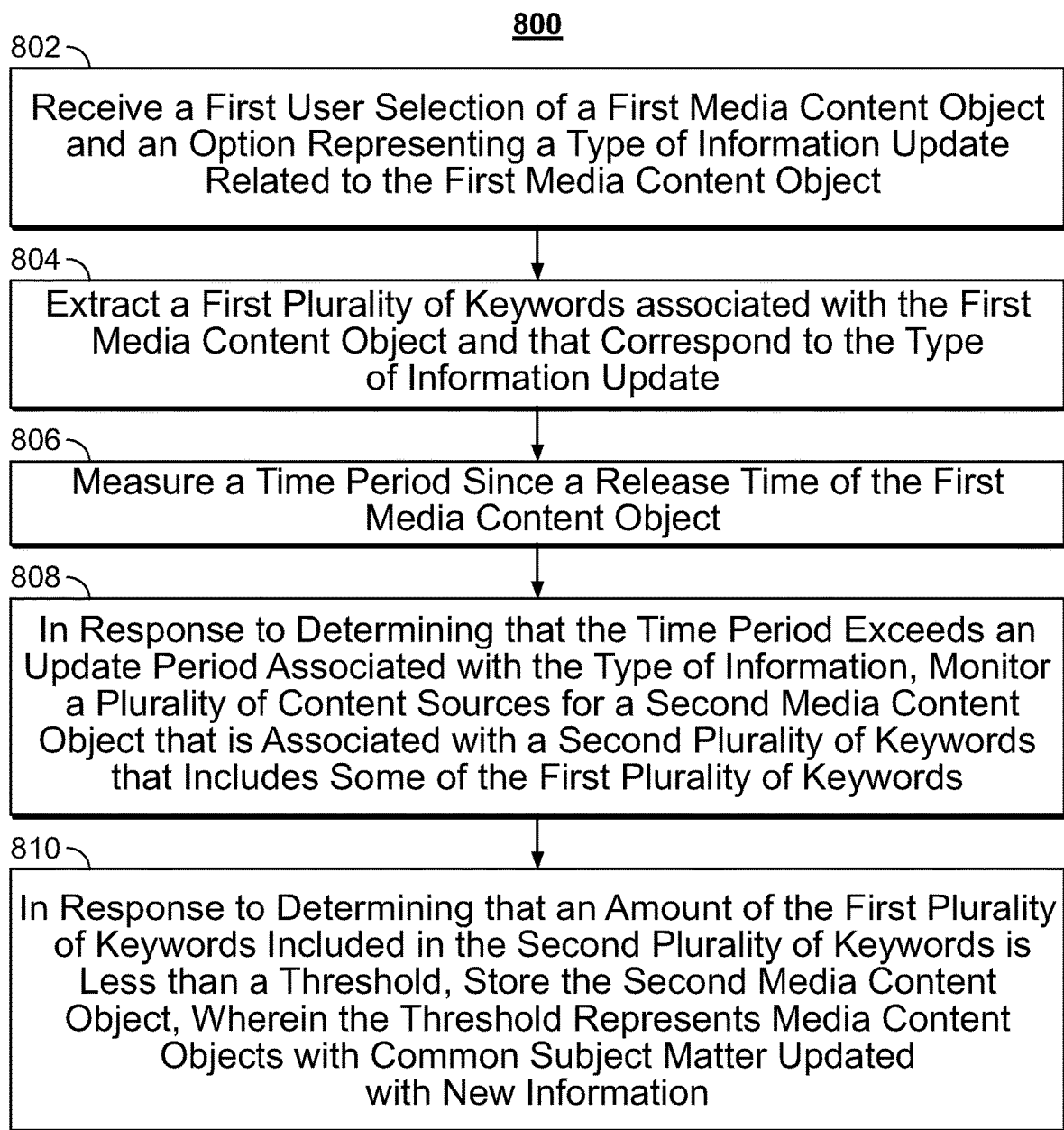
FIG. 8 is a flowchart of an illustrative process for aggregating related media content based on a first user selection, in accordance with some embodiments of the disclosure.

FIG. 8 is a flowchart of illustrative steps of a process 800 for aggregating related media content based on a first user selection, in accordance with some embodiments of the disclosure. It should be noted that process 800 or any step thereof could be performed on, or provided by, any of the devices shown in FIGS. 6-7. For example, process 800 may be executed by control circuitry 604 (FIG. 6) as instructed by a media guidance application implemented on a user device (e.g., user equipment devices 702, 704, and/or 706 (FIG. 7)) in order to aggregate related media content based on a first user selection. In addition, one or more steps of process 800 may be incorporated into or combined with one or more steps of any other process or embodiment (e.g., as described in relation to FIGS. 1-2, and 9-15).

Consider a situation in which a user is viewing a news report about a bank robbery on FOX News. Based on his/her interest, the user may choose to tag the story via I/O Path 602 (FIG. 6) on a user input interface 610 generated by control circuitry 604. At step 802, control circuitry 604 receives a first user selection of a first media content object. The first media content object may be a video clip of the news report. Control circuitry 604 also receives an option representing a type of information update related to the first media content object. For example, the option may represent information types pertaining to "police investigations" or "court cases." This type of information update may represent an aspect of the story that the user is interested in (e.g., police investigations may deal with crime scene analysis and court cases may deal with any court matters once the robber is caught).

At step 804, control circuitry 604 (FIG. 6) extracts a first plurality of keywords that is associated with the first media content object and that corresponds to the type of information update. Control circuitry 604 (FIG. 6) may extract keywords in different ways. For example, control circuitry 604 may retrieve, from the media guidance data source 718 (FIG. 7), metadata associated with the media content object, to determine keywords. Control circuitry 604 may also extract subtitles from the media content object. Control circuitry 604 may utilize natural language processing and speech recognition to determine text from audio associated with the media content object.

Control circuitry 604 (FIG. 6) may also utilize computer vision processes (e.g., segmentation, edge detection) to identify objects on the screen. For example, the media guidance application may identify images of a bank on the screen and classify "bank" as a keyword. Images of various recurring objects may be stored in an image database in storage 608 with the classified name. For example, images of a bank may be stored and classified as "bank." When control circuitry 604 detects a potential image of a bank in the media content object, control circuitry 604 may compare the potential image with images in the image database. If a match exists, control circuitry 604 may determine an additional keyword as the classified name associated with the matching images in the image database. Similarly, the media guidance application may parse images of text on the screen such as "Breaking News: Bank Robbery in Manhattan," convert to text, and classify "bank," "robbery" and "Manhattan" as keywords. In this case, the keywords may include "robber," "Citibank," "stolen," "Manhattan," "Broadway," "October," "money," etc.

At step 806, control circuitry 604 (FIG. 6) measures a time period since a release time of the first media content object. For example, control circuitry 604 may refer to the metadata of the first media content object retrieved from the media guidance data source 718 (FIG. 7), to determine that the first media content object was broadcasted on FOX News on Monday Oct. 16, 2017 at 5:00 pm. Based on the type of information update, control circuitry 604 may set an update period and store the value of the update period in storage 608. Suppose that the type of information update is associated with court cases. Control circuitry 604 may set the update period to every three months because court case developments are not frequent. The process of deriving the update period is discussed in detail in the description of FIG. 12.

At step 808, in response to determining that the time period exceeds an update period associated with the type of information, control circuitry 604 (FIG. 6) monitors a plurality of content sources for a second media content object that is associated with a second plurality of keywords that includes some of the first plurality of keywords. Control circuitry 604 may measure a time period since the release time of the first media content object (e.g., Oct. 16, 2017 at 5:00 pm) and after three months (e.g., Jan. 16, 2018 at 5:00 pm) determine that the time period exceeds the update period. Control circuitry 604 may then monitor a plurality of content sources (e.g., news channels) at the media content source 716 (FIG. 7) for a second media content object (e.g., video of a news story update). Control circuitry 604 may extract a second plurality of keywords from the second media content object. These keywords may include "robber," "Manhattan," "Broadway," "Citibank," "October," "trial," "judge," and "guilty." The second plurality of keywords may include some of the first plurality of keywords. In this example, control circuitry 604 may determine that "robber," "Manhattan," "Broadway," "Citibank," and "October" appear in both pluralities of keywords.

At step 810, in response to determining that an amount of the first plurality of keywords included in the second plurality of keywords is less than a threshold, control circuitry 604 (FIG. 6) may store the second media content object in storage 608, wherein the threshold represents media content objects with common subject matter updated with new information. The threshold may be a quantitative (e.g., percentage, fraction, etc.) or qualitative (e.g., similar, not similar, etc.) value that is used to determine whether the second media content object offers new information, or is too similar to the first media content object. For example, control circuitry 604 may set the threshold to be a percentage of similar keywords (e.g., 60%). Upon determining that the second media object has common subject matter (process discussed in FIG. 10), the media guidance application may note that out of 10 unique words, the two pluralities share five keywords (e.g., 50%). Control circuitry 604, may determine that this value is less than the threshold. Thus, the media guidance application may store the second media content object.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 8.

Figure 9:
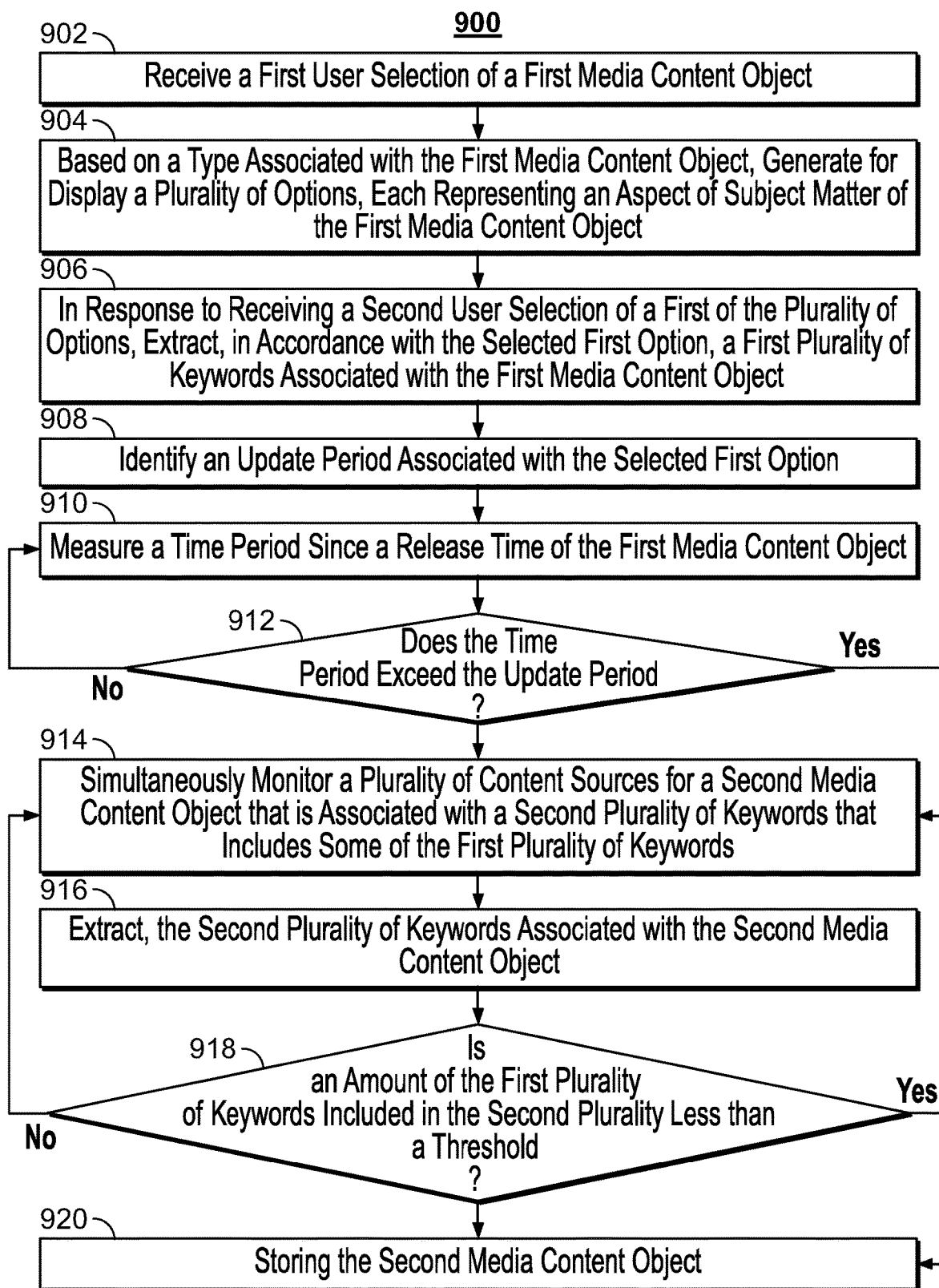
FIG. 9 is a flowchart of a detailed illustrative process for aggregating related media content based on a first user selection, in accordance with some embodiments of the disclosure

FIG. 9 is a flowchart of illustrative steps of a process 900 for aggregating related media content based on a first user selection, in accordance with some embodiments of the disclosure. It should be noted that process 900 or any step thereof could be performed on, or provided by, any of the devices shown in FIGS. 6-7. For example, process 900 may be executed by control circuitry 604 (FIG. 6) as instructed by a media guidance application implemented on a user device (e.g., user equipment devices 702, 704, and/or 706 (FIG. 7)) in order to aggregate related media content based on a first user selection. In addition, one or more steps of process 900 may be incorporated into or combined with one or more steps of any other process or embodiment (e.g., as described in relation to FIGS. 1-2, 8, and 10-15).

At step 902, control circuitry 604 (FIG. 6) receives a first user selection of a first media content object. Continuing from the previous example, suppose that the user is viewing a news report on CNN News about a bank robbery in New York City. The media guidance application may allow the user to tag the story through a user input interface 610 on display 612. Based on his/her interest, the user may end up tagging the story. Control circuitry 604 may receive a selection associated with the first media content object (e.g., video clip of the news story) via I/O Path 602.

At step 904, based on a type associated with the first media content object, control circuitry 604 (FIG. 6) generates for display a plurality of options, each representing an aspect of subject matter of the first media content object. The options may be presented as a part of user input interface 610 on display 612 and are depicted in overlay 102 (FIG. 1). For example, control circuitry 604 may generate, for display, types of information updates such as victim updates, court cases, and police investigations. Each type of information update is associated with a unique theme. Furthermore, each option may be associated with a set of keywords predetermined by control circuitry 604, and stored in storage 608. These keywords may be generated by control circuitry 604, based on information retrieved from the media guidance data source 608. For example, victim updates may deal with the impact of robbery on the bank employees, bystanders and the community. Associated keywords of victim updates may include "victim," "employee," "community," etc. Court cases may encompass any legal cases or charges associated with the bank robbers. Associated keywords of court cases may include "court," "judge," "charged," "law," etc.

At step 906, in response to receiving a second user selection of a first of the plurality of options, control circuitry 604 (FIG. 6) extracts, in accordance with the selected first option, a first plurality of keywords associated with the first media content object. For example, the user may select the police investigations option on the user input interface 610, via I/O Path 602. In response, control circuitry 604 may begin the process of extracting keywords from the media content object. As discussed previously, control circuitry 604 may extract keywords from metadata associated with the media content object and subtitles from the media content object. Control circuitry 604 may utilize natural language processing and speech recognition to determine text from audio associated with the media content object. Control circuitry 604 may also execute computer vision processes (e.g., segmentation, edge detection) to identify objects on the screen and classify them using an image database. Similarly, control circuitry 604 may parse images of text on the screen such as "Breaking News: Bank Robbery in Manhattan," convert to text, and classify "bank," "robbery" and "Manhattan" as keywords. The processes (e.g., speech recognition, computer vision, classification, etc.) that control circuitry 604 executes to determine keywords can be used in combination. In some embodiments, all processes may be used, while in others, some processes may be omitted.

In the overarching example, suppose that control circuitry 604 (FIG. 6) utilizes all methods listed above to extract keywords. The first plurality of keywords, as determined by control circuitry 604, may thus include "Manhattan," "bank," "robbery," "money," "gun," "camera," etc.

At step 908, control circuitry 604 (FIG. 6) identifies an update period associated with the selected first option. Options may be associated with update periods (e.g., unit of time) based on the frequency of occurrences of updates in an option. The process for deriving the update period is discussed in the description of FIG. 12. Suppose that control circuitry 604 provides three options: police investigations, victim updates, and court cases. Court cases, the third option, may have a monthly update period. This is because reports on court cases may be infrequent. Police investigations and victim updates, the first and second options, may each have hourly update periods. This is because stories of police searches, victim interviews, and clues may be transmitted frequently after the crime. Based on the user's selected option, police investigations, control circuitry 604 may set the update period associated with the first media content object as hourly.

At step 910, control circuitry 604 (FIG. 6) measures a time period since a release time of the first media content object. The release time is the time at which the first media content object was transmitted by the content provider. For example, the release time for a news broadcast about the bank robbery in Manhattan may be Oct. 7, 2017 at 5:00 pm. Suppose that the user chooses to tag the news broadcast. Control circuitry 604 may identify the news broadcast video clip as the first media content object and begin measuring time from the release time (e.g., incrementing by a unit of time).

At step 912, control circuitry 604 (FIG. 6) determines whether the time period exceeds the update period by comparing the time value of the time period and the time value of the update period. Control circuitry 604 may compare the measured time period with the update period whenever control circuitry 604 increments the time period (e.g., every minute). In this case, for example, control circuitry 604 may determine that the time period exceeds the update period at 6:00 pm on Oct. 7, 2017 because the update period is hourly. If the time period does not exceed the update period, the process returns to step 910 and control circuitry 604 continues measuring time.

At step 914, in response to determining that the time period exceeds the update period, control circuitry 604 (FIG. 6) simultaneously monitors a plurality of content sources for a second media content object that is associated with a second plurality of keywords that includes some of the first plurality of keywords. Control circuitry 604 may also reset the measured time period and restart the measuring process. Control circuitry 604 may extract the second plurality of keywords associated with the second media content object. Suppose that at 6:00 pm, control circuitry 604 monitors the media content source 716 (FIG. 7) and detects a second media content object.

At step 916, control circuitry 604 (FIG. 6) extracts a second plurality of keywords from the second media content object using computer vision and natural language processing. For example, the audio of the second media content object may feature a news reporter discussing how the robbers wore masks, but left a gun with fingerprints. Using natural language processing, control circuitry 604 may identify keywords including "Manhattan," "bank," "robbery," "mask," "gun," "camera," "fingerprints," etc.

At step 918, control circuitry 604 (FIG. 6) determines whether an amount of the first plurality of keywords included in the second plurality of keywords is less than a threshold, wherein the threshold represents media content objects with common subject matter updated with new information. Control circuitry 604 may first determine whether the second media content object has common subject matter with the first media content object based on an options threshold and a lower level threshold. This process is discussed in detail in the description of FIG. 10. Suppose that control circuitry 604 determines that both media content objects indeed share common subject matter.

In response to determining that the second media content object has common subject matter with the first media content object, control circuitry 604 (FIG. 6) may determine that the amount of the first plurality of keywords included in the second plurality of keywords is less than a threshold. Control circuitry 604 may retrieve, from storage, the threshold, which may be 80%. Therefore, if the second plurality of keywords shares 80% or higher of its keywords with the first plurality of keywords, control circuitry 604 may determine not to store the second media content object (e.g., the second media content object is too similar to the first media content object and may be the same news story). In the example given, the shared keywords in the second plurality of keywords only account for approximately 72% of the total keywords in the second plurality. Therefore, control circuitry 604 may determine that the amount of the first plurality of keywords included in the second plurality of keywords is less than the threshold.

At step 920, upon determining that an amount of the first plurality of keywords included in the second plurality is less than a threshold, or in some embodiments, that the second plurality of keywords satisfies the lower, upper, and option thresholds (discussed in FIG. 10 description), control circuitry 604 (FIG. 6) may store the second media content object in memory (e.g., storage 608). This signifies that the second media content object (e.g., video clip) covers the same story that the user selected (e.g., first media content object). Furthermore, the second media content object is unique and adds additional information to the story. Lastly, the second media content object corresponds to the aspect of the subject matter requested by the user.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 9.

Figure 10:
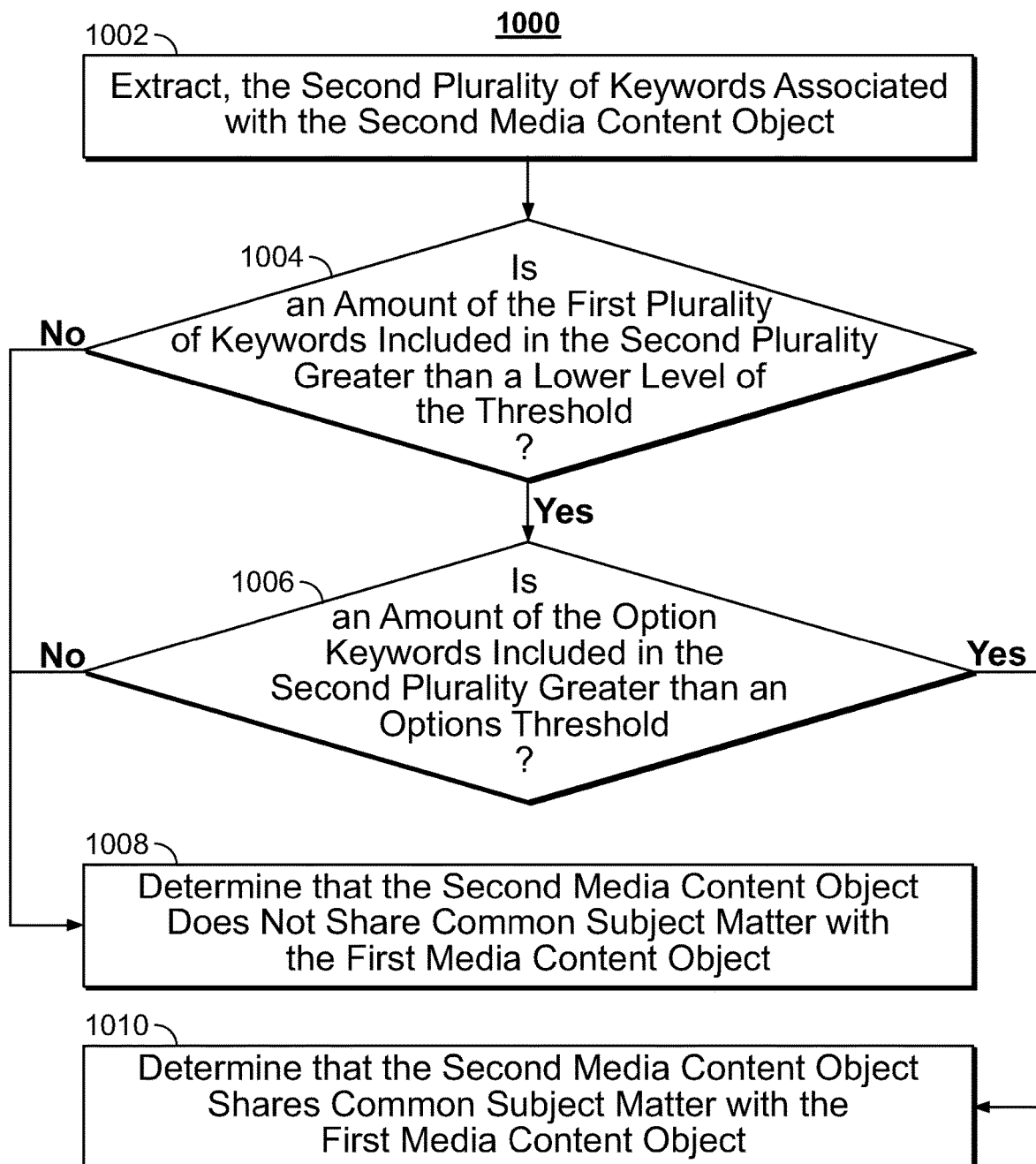
FIG. 10 is a flowchart of a detailed illustrative process for determining that the second media content object shares common subject matter with the first media content object, in accordance with some embodiments of the disclosure.

FIG. 10 is a flowchart of illustrative steps of a process 1000 for determining that the second media content object shares common subject matter with the first media content object, in accordance with some embodiments of the disclosure. It should be noted that process 1000 or any step thereof could be performed on, or provided by, any of the devices shown in FIGS. 6-7. For example, process 1000 may be executed by control circuitry 604 (FIG. 6) as instructed by a media guidance application implemented on a user device (e.g., user equipment devices 702, 704, and/or 706 (FIG. 7)) in order to determine that the second media content object shares common subject matter with the first media content object. In addition, one or more steps of process 1000 may be incorporated into or combined with one or more steps of any other process or embodiment (e.g., as described in relation to FIGS. 1-2, 8-9, and 11-16).

At step 1002, control circuitry 604 (FIG. 6) extracts the second plurality of keywords associated with the second media content object. For example, control circuitry 604 may utilize natural language processing and speech recognition to parse the audio of a news reporter discussing a new development in the robbery case. The second plurality of keywords may thus include "Manhattan," "bank," "robbery," "mask," "gun," "camera," and "fingerprints."

At step 1004, control circuitry 604 (FIG. 6) may determine if the amount of the first plurality of keywords included in the second plurality of keywords is greater than a lower level of the threshold. For example, the threshold may have an upper level and a lower level, which control circuitry 604 retrieves from storage 608. The upper level represents the maximum allowable amount of the first plurality of keywords that can be included in the second plurality of keywords. In contrast, the lower level represents the minimum allowable amount of the first plurality of keywords that can be included in the second plurality of keywords. An allowable amount is the amount which control circuitry 604 determines sufficient for storing a media content object.

Control circuitry 604 (FIG. 6) may determine that the second media content object has common subject matter with the first media content object if the lower level of the threshold is met. For example, the first plurality of keywords may include "Manhattan," "bank," "robbery," "money," "gun," and "camera." The second plurality of keywords may include "Manhattan," "bank," "robbery," "mask," "gun," "camera," and "fingerprints." Collectively, both pluralities contain eight unique words. The second plurality of keywords shares five words with the first plurality of keywords. In this example, control circuitry 604 may retrieve the lower level of the threshold from storage 608 and determine that the lower level of the threshold is 30%. In order to be considered common subject matter with the first media content object, control circuitry 604 therefore requires at least 30% of the words to be shared with the first plurality of keywords. In this case, approximately 72% of the second plurality of keywords are also included in the first plurality of keywords. Based on this, control circuitry 604 may determine that the second media content object has common subject matter with the first media content object.

At step 1006, in response to determining that the amount of the first plurality of keywords included in the second plurality of keywords is greater than lower level of the threshold, control circuitry 604 (FIG. 6) determines whether the amount of option keywords included in the second plurality of keywords is greater than an options threshold. As discussed previously, option keywords are predetermined by control circuitry 604 and are associated with the user selected options (generated by the media guidance application). Option keywords may be words that universally describe a topic. For example, the topic of police investigations may be associated with option keywords such as "police," "camera," "witness," "questioning," etc.

Option keywords may be generated by control circuitry 604 (FIG. 6), based on information analyzed from the media guidance data source 718 (FIG. 7). For example, control circuitry 604 may create a subject matter database in storage 608. Control circuitry 604 may analyze media content from the media guidance data source 718 and generate several aspects of subject matter such as police investigations, victim updates and court cases. For example, control circuitry 604 may retrieve news articles about crimes and determine aspects of a crime case. These aspects may encompass the type of crime, the parties affected by the crime and the aftermath. Suppose that control circuitry 604 identifies one hundred news articles about various court cases dealing with robberies and generates keywords, using natural language processing, for each article. Control circuitry 604 may determine keywords that are present in all articles such as "law," "robber," "lawyer," "sentenced," and store them in the subject matter database under the subject matter column, "court cases."

Control circuitry 604 (FIG. 6) may set an option threshold which represents the minimum amount of option keywords that need to be included in the second plurality of keywords. Control circuitry 604 may retrieve the option threshold (e.g., set to 10%) from storage 608. If the second plurality of keywords includes "Manhattan," "bank," "robbery," "mask," "gun," "camera," and "fingerprints," control circuitry 604 may determine that "camera" is an option keyword that accounts for approximately 14% of the second plurality of keywords. Therefore, control circuitry 604 may determine that the amount of the option keywords included in the second plurality of keywords is greater than the options threshold, and in response, may determine, at step 1010, that the second media content object shares common subject matter with the first media content object. If the amount is less than the lower level of the threshold or the options threshold at step 1004 and step 1006 respectively, the process proceeds to step 1008. At step 1008, control circuitry 604 determines that the second media content object does not share common subject matter with the first media content object.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 10.

Figure 11:
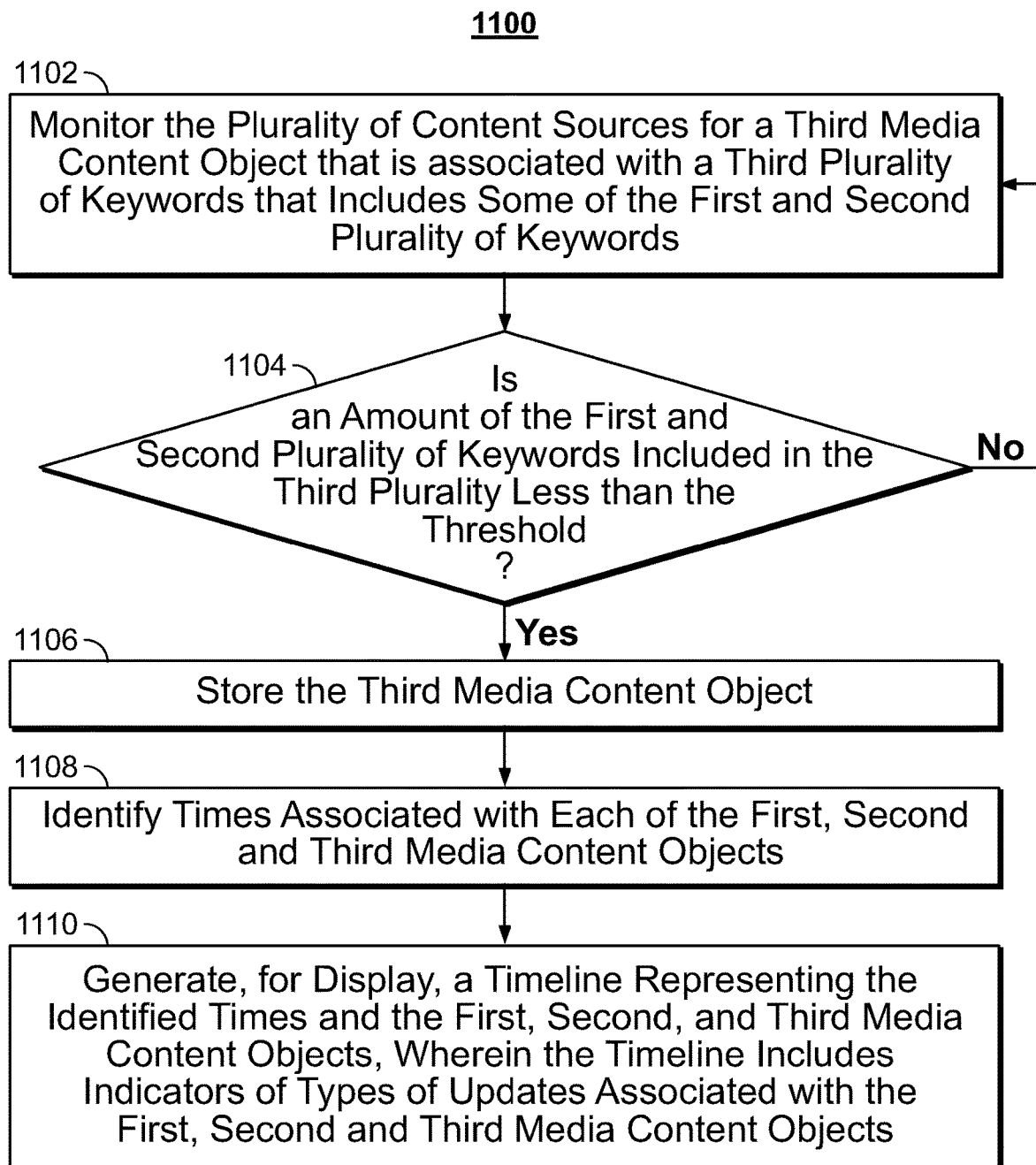
FIG. 11 is a flowchart of a detailed illustrative process for generating, for display, a timeline representing identified times of stored media content objects, in accordance with some embodiments of the disclosure.

FIG. 11 is a flowchart of illustrative steps of a process 1100 for generating, for display, a timeline representing identified times of stored media content objects, in accordance with some embodiments of the disclosure. It should be noted that process 1100 or any step thereof could be performed on, or provided by, any of the devices shown in FIGS. 6-7. For example, process 1100 may be executed by control circuitry 604 (FIG. 6) as instructed by a media guidance application implemented on a user device (e.g., user equipment devices 702, 704, and/or 706 (FIG. 7)) in order to generate, for display, a timeline representing identified times of stored media content objects. In addition, one or more steps of process 1100 may be incorporated into or combined with one or more steps of any other process or embodiment (e.g., as described in relation to FIGS. 1-2, 8-10, and 12-16).

At step 1102, control circuitry 604 (FIG. 6) monitors the plurality of content sources for a third media content object that is associated with a third plurality of keywords that includes some of the first and second plurality of keywords. For example, control circuitry 604 may detect an additional news story about the bank robbery from the media content source 716 (FIG. 7). The additional news story may be a video clip from CNN News and may be identified as a third media content object by control circuitry 604. Control circuity 604 may extract a third plurality of keywords associated with the third media content object. For example, the additional news story may account for the robber being caught by the police. Control circuitry 604 may utilize natural language processing and computer vision to extract subtitles and words on the screen during the news report. Control circuitry 604 may therefore determine a third plurality of keywords including "Manhattan," "bank," "robbery," "fingerprint," "camera," "caught," and "charged." It should be noted that the third plurality of keywords shares several keywords with the first and second pluralities. The only keywords unique to the third plurality of keywords are "caught" and "charged."

At step 1104, control circuitry 604 (FIG. 6) determines whether the amount of first and second pluralities of keywords included in the third plurality of keywords is less than the threshold. In some embodiments, control circuitry 604 may also execute process 1000 (FIG. 10) to ensure that the third media content object shares common subject matter with the first and/or second media content object. Control circuitry 604 may then retrieve from storage the threshold, which may be 80%. Therefore, if the third plurality of keywords shares 80% or higher of its keywords with the first and second pluralities of keywords, control circuitry 604 may determine not to store the third media content object (e.g., the third media content object is too similar to the first/second media content object and may be the same news story). In the example given, the shared keywords in the third plurality of keywords only account for approximately 72% of the total keywords in the third plurality. Therefore, control circuitry 604 may determine that the amount of the first and second pluralities of keywords included in the third plurality of keywords is less than the threshold.

At step 1106, in response to determining that the amount of the first and second pluralities of keywords included in the third plurality of keywords is less than the threshold, control circuitry 604 (FIG. 6) stores the third media content object in storage 608. If the amount exceeds the threshold, the process returns to step 1102 and control circuitry 604 monitors for a different third media content object.

At step 1108, control circuitry 604 (FIG. 6) identifies release times associated with each of the first, second and third media content objects. The release time is the time at which a media content object is transmitted by the content provider and may be retrieved from the media guidance data source 718 (FIG. 7). For example, the release time for the news broadcast about the bank robbery (e.g., first media content object) may be Oct. 16, 2017 at 5:00 pm. The release time for the news update about the robber being identified (e.g., second media content object) may be Oct. 17, 2017 at 5:00 pm. The release for the news report about the robber being caught (e.g., third media content object) may be Oct. 20, 2017 at 6:00 pm.

At step 1110, control circuitry 604 (FIG. 6) generates, for display, a timeline (e.g., presented in FIG. 3) representing the identified times and the first, second, and third media content objects, wherein the timeline includes indicators of types of updates associated with the first, second and third media content objects. The timeline may be shown as a user input interface 610 on display 612. As discussed in FIG. 3, the timeline may display buttons that initiate playback of the respective media content object in storage. The indicators may include information about the release time and the type of update (e.g., police investigations, court cases, victim updates, etc.).

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 11.

Figure 12:
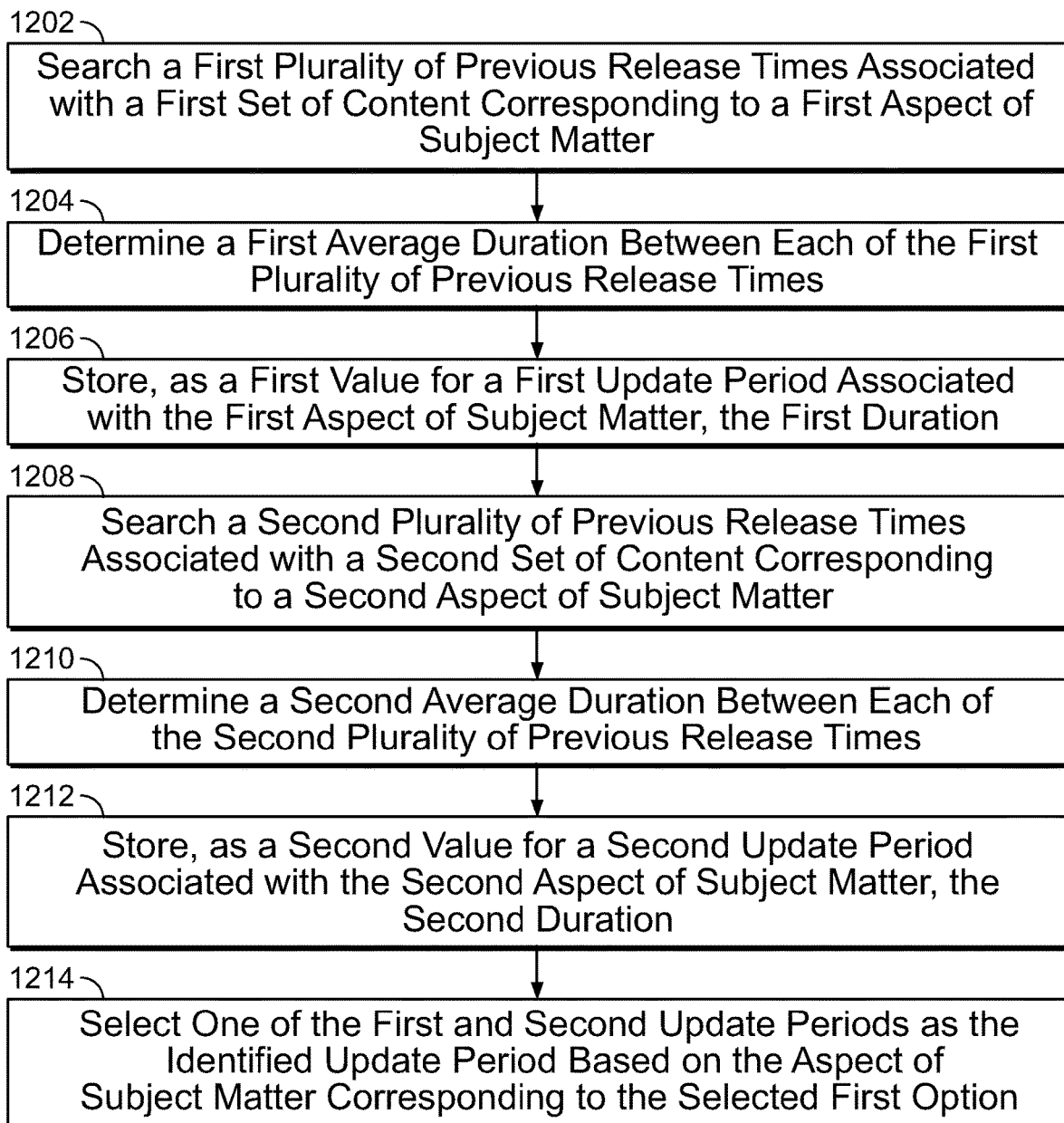
FIG. 12 is a flowchart of a detailed illustrative process for determining an update period for a selected option, in accordance with some embodiments of the disclosure.

FIG. 12 is a flowchart of illustrative steps of a process 1200 for determining an update period for a selected option, in accordance with some embodiments of the disclosure. It should be noted that process 1200 or any step thereof could be performed on, or provided by, any of the devices shown in FIGS. 6-7. For example, process 1200 may be executed by control circuitry 604 (FIG. 6) as instructed by a media guidance application implemented on a user device (e.g., user equipment devices 702, 704, and/or 706 (FIG. 7)) in order to determine an update period for a selected option. In addition, one or more steps of process 1200 may be incorporated into or combined with one or more steps of any other process or embodiment (e.g., as described in relation to FIGS. 1-2, 8-11, and 13-16).

At step 1202, control circuitry 604 (FIG. 6) searches a first plurality of previous release times associated with a first set of content corresponding to a first aspect of subject matter. For example, the first aspect of the subject matter may be police investigations. The first set of content may therefore include news stories about the police searching for clues to track the bank robber. The first plurality of previous release times may be associated with each respective story (e.g., the first news story has a first release time, the second news story has a second release time, etc.). Control circuitry 604 may refer to the media guidance data source 716 (FIG. 7) to retrieve metadata, such as release times, of media content objects. Furthermore, control circuitry 604 may update in storage 608, the subject matter database, whenever control circuity 604 identifies a media content object. For example, under a "police investigations" section of the subject matter database, control circuitry 604 may store release times of each identified media content object with common subject matter.

At step 1204, control circuitry 604 (FIG. 6) determines a first average duration between each of the first plurality of previous release times. Suppose that control circuitry 604 retrieves release times of various stories under "police investigations" in the subject matter database. Control circuitry 604 may determine that the first story has a release time of 9:00 pm on Monday and the second story has a release time of 9:00 pm on the following Tuesday. Control circuitry 604 may determine that there are 24 hours between the two release times and determine the amount of time between the second release time and a third release time. This process may continue until all media content objects under "police investigations" are accounted for in the subject matter database. Control circuitry 604 may then determine the average duration between all release times.

At step 1206, control circuitry 604 (FIG. 6) stores the first average duration, as a first value for a first update period associated with the first aspect of subject matter. For example, control circuitry 604 may store 24 hours as the update period for content associated with police investigations if the average duration between release times is 24 hours. This represents the amount of time control circuitry 604 waits before monitoring for additional media content objects. It should be noted that if control circuitry 604 fails to find an additional media content object that shares common subject matter with the first media content object, control circuitry 604 may continue searching only until a time limit. For example, there may no longer be updates about a specific news story. Control circuitry 604 may retrieve the time limit from a user profile in storage 608. The time limit may be 60 days (e.g., set by the user). Thus, after 60 days, control circuitry 604 may stop monitoring for additional media content objects.

At step 1208, control circuitry 604 (FIG. 6) searches a second plurality of previous release times associated with a second set of content corresponding to a second aspect of subject matter. For example, the second aspect of subject matter may be "court cases." Control circuitry 604 may refer to the subject matter database and retrieve release times of media content objects associated with "court cases."

At step 1210, control circuitry 604 (FIG. 6) determines a second average duration between each of the second plurality of previous release times. As mentioned in the previous example, control circuitry 604 may retrieve the release times found under "court cases," and determine a second average duration between the release times of the media content objects.

At step 1212, control circuitry 604 (FIG. 6) stores the second average duration, as a second value for a second update period associated with the second aspect of subject matter. For example, control circuitry 604 may set the second average duration determined in the previous step as the update period associated with the second aspect of subject matter "court cases."

At step 1214, control circuitry 604 (FIG. 6) selects one of the first and second update periods as the identified update period based on the aspect of subject matter corresponding to the selected first option. For example, the user may select "police investigations" as the subject matter in the first option. Control circuitry 604 may therefore set the update period to the first update period, which is the average duration between news updates associated with police investigations.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 12.

Figure 13:
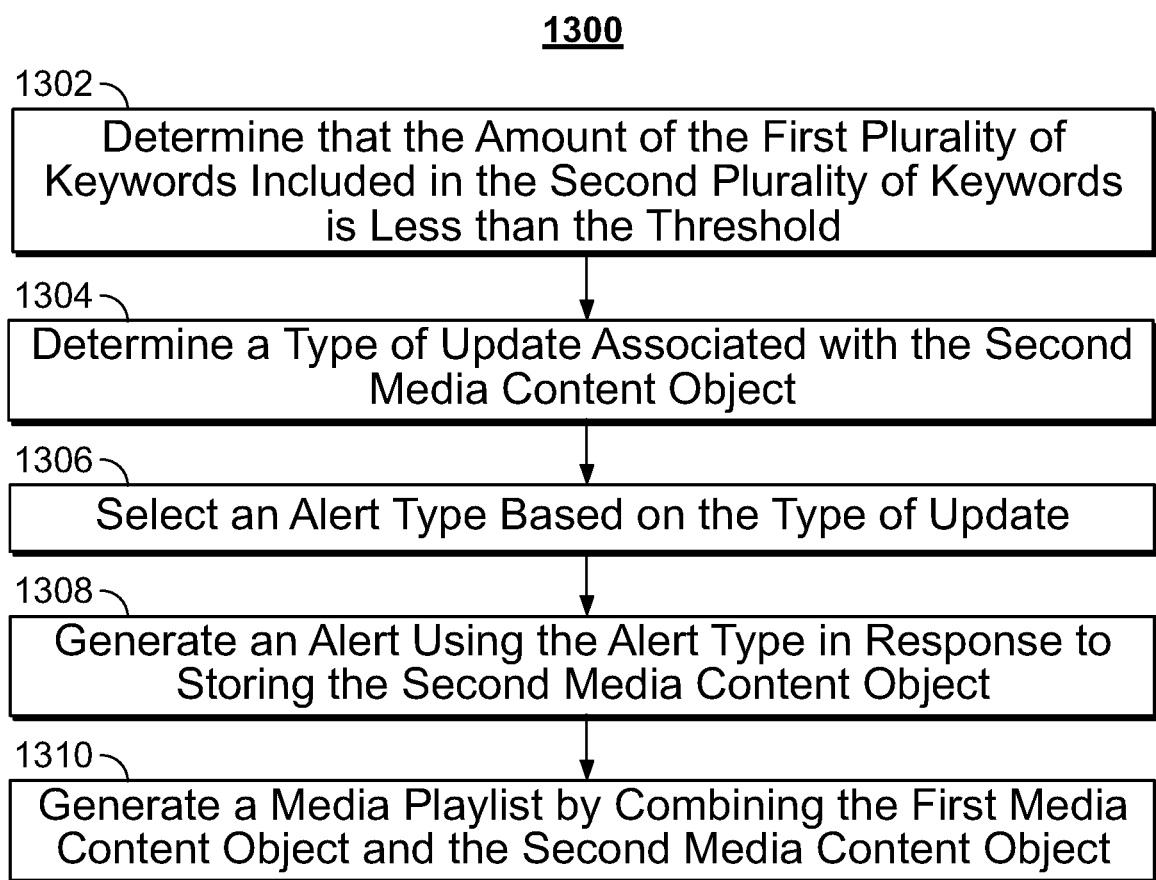
FIG. 13 is a flowchart of a detailed illustrative process for generating a media playlist and alerting the user of stored media content objects, in accordance with some embodiments of the disclosure.

FIG. 13 is a flowchart of illustrative steps of a process 1300 for generating a media playlist and alerting the user of stored media content objects, in accordance with some embodiments of the disclosure. It should be noted that process 1300 or any step thereof could be performed on, or provided by, any of the devices shown in FIGS. 6-7. For example, process 1300 may be executed by control circuitry 604 (FIG. 6) as instructed by a media guidance application implemented on a user device (e.g., user equipment devices 702, 704, and/or 706 (FIG. 7)) in order to generate a media playlist and alert the user of stored media content objects. In addition, one or more steps of process 1300 may be incorporated into or combined with one or more steps of any other process or embodiment (e.g., as described in relation to FIGS. 1-2, 8-12, and 14-16).

At step 1302, control circuitry 604 (FIG. 6) determines that the amount of the first plurality of keywords included in the second plurality of keywords is less than the threshold. As discussed previously, in response to determining that the amount is less than the threshold, control circuitry 604 stores the second media content object in storage 608. This signifies that the second media content object shares common subject matter with the first media content object and includes additional information relating to the subject matter.

At step 1304, control circuitry 604 (FIG. 6) determines a type of update associated with the second media content object. The type of update is associated with the options displayed to the user (e.g., police investigations, court cases, victim updates, etc.) For example, control circuitry 604 (FIG. 6) may determine whether the amount of option keywords included in the second plurality of keywords is greater than an options threshold. As discussed previously, option keywords are predetermined by control circuitry 604 and are associated with the user selected options. For example, the topic of police investigations may be associated with option keywords such as "police," "camera," "witness," "questioning," etc. If the amount of option keywords exceeds the options threshold, control circuitry 604 may determine the type of update associated with the second media content object (e.g., type of update is determined to be police investigations because the amount of keywords associated with police investigations is greater than the options threshold).

At step 1306, control circuitry 604 (FIG. 6) selects an alert type based on the type of update. For example, the type of update, police investigations, may be associated with a specific alert type. Control circuitry 604 may retrieve the alert type from the subject matter database in storage 608. Alert types may include pop-up notifications on display 612, calendar events in the user profile, or an accessible user input interface 610 that lists all media content objects associated with a particular subject matter. For example, control circuitry 604 may generate an overlay on display 612 informing the user that a second media content object has been detected. Control circuitry 604 may also retrieve a user profile of the user that includes the user's viewing history and calendar. Control circuitry 604 may include a notification in the user's calendar. This process is discussed further in the description of FIG. 15.

At step 1308, control circuitry 604 (FIG. 6) generates an alert using the alert type in response to storing the second media content object. Suppose that the type of update is police investigations. Control circuitry 604 may retrieve, from the subject matter database in storage 608, an alert type associated with police investigations. Suppose that the alert type is a pop-up notification. Control circuitry 604 may generate the notification on display 612.

At step 1310, Control circuitry 604 (FIG. 6) generates a media playlist by combining the first media content object and the second media content object. For example, control circuitry 604 may link the notification with the media playlist and may receive a user request to access the media playlist upon clicking the notification (e.g., via I/O Path 602). The media playlist may feature a merged media content object of the first and second media content object. The media playlist may also keep the media content objects separate, but in an order based on release time.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 13.

Figure 14:
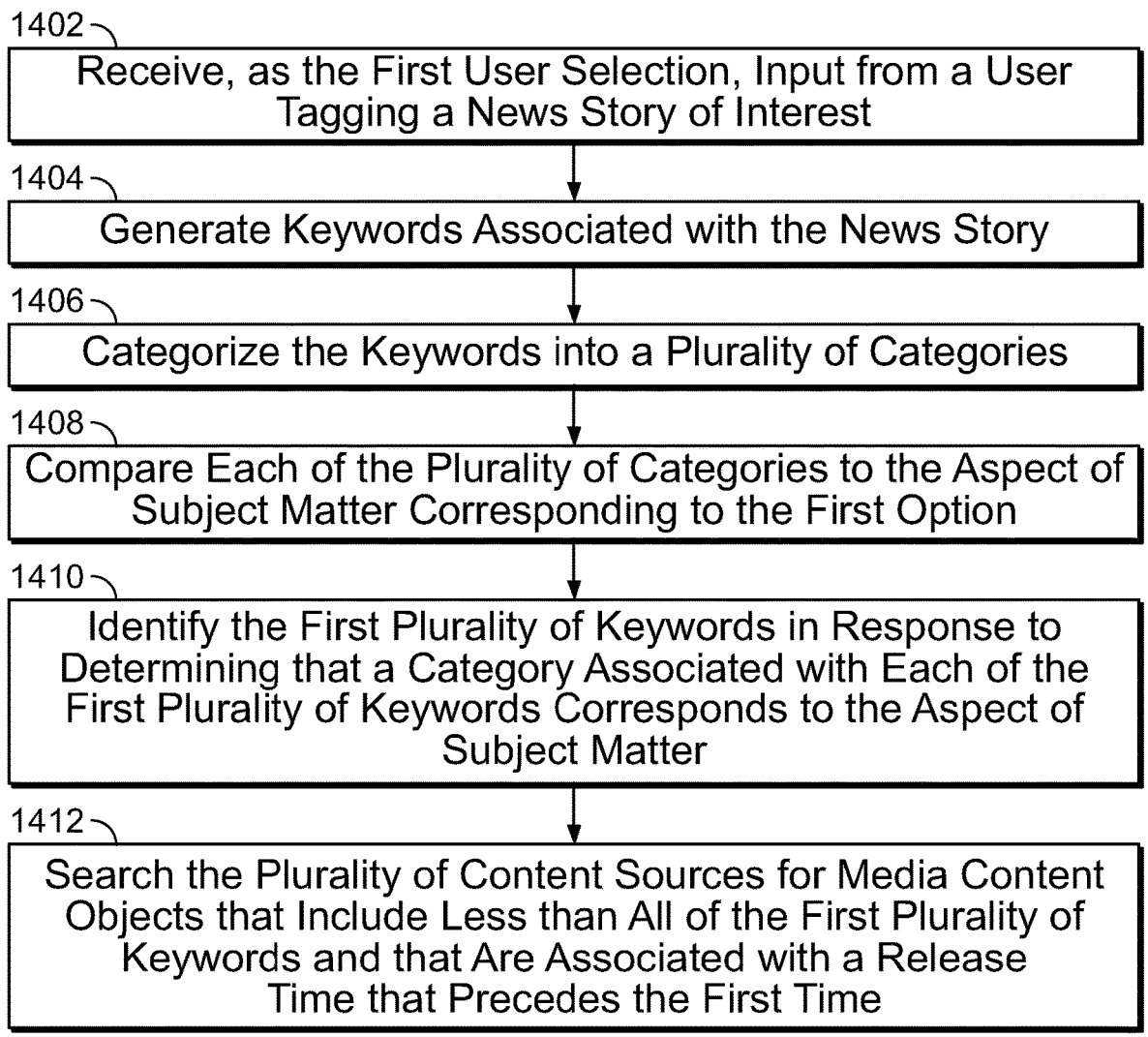
FIG. 14 is a flowchart of a detailed illustrative process for searching for media content objects that have release times that precede the time of the first user selection, in accordance with some embodiments of the disclosure.

FIG. 14 is a flowchart of illustrative steps of a process 1400 for searching for media content objects that have release times that precede the time of the first user selection, in accordance with some embodiments of the disclosure. It should be noted that process 1400 or any step thereof could be performed on, or provided by, any of the devices shown in FIGS. 6-7. For example, process 1400 may be executed by control circuitry 604 (FIG. 6) as instructed by a media guidance application implemented on a user device (e.g., user equipment devices 702, 704, and/or 706 (FIG. 7)) in order to search for media content objects that have release times that precede the time of the first user selection. In addition, one or more steps of process 1400 may be incorporated into or combined with one or more steps of any other process or embodiment (e.g., as described in relation to FIGS. 1-2, 8-13, and 15-16).

At step 1402, control circuitry 604 (FIG. 6) receives, as the first user selection, input from a user, tagging a news story of interest. Continuing from the previous example, suppose that the user is viewing a news report on CNN News about a bank robbery in New York City. Control circuitry 604 may allow the user to tag (i.e., select) the story through a user input interface 610 on display 612. Based on his/her interest, the user may end up tagging the story. Control circuitry 604 may receive a selection associated with the first media content object (e.g., video clip of the news story) via I/O Path 602.

At step 1404, control circuitry 604 (FIG. 6) generates keywords associated with the news story. Control circuitry 604 (FIG. 6) may generate keywords by retrieving, from the media guidance data source 718 (FIG. 7), metadata associated with the media content object. Control circuitry 604 may extract subtitles from the media content object. Control circuitry 604 may also utilize natural language processing and speech recognition to determine text from audio associated with the media content object.

At step 1406, control circuitry 604 (FIG. 6) categorizes the keywords into a plurality of categories. For example, control circuitry 604 may categorize the keywords using data analytics processing (e.g., clustering, classification), to determine a plurality of categories. The plurality of categories represents recurring themes or concepts. In some embodiments, control circuitry 604 may transcribe the news report and analyze all words to generate the plurality of categories. Suppose that one of the categories in the plurality of categories is "court cases." Keywords such as "judge," "trial," and "law" may be categorized under "court cases" because the data analytics process, clustering, may associate the keywords with "court cases" (e.g., since "judge," "trial," and "law" may be mentioned frequently alongside "court" in a news report).

At step 1408, control circuitry 604 (FIG. 6) compares each of the plurality of categories to the aspect of subject matter corresponding to the first option. For example, the plurality of categories may include "police investigations," "court cases" and "victim updates." Control circuitry 604 may determine that the first aspect of subject matter, police investigation, corresponds to the first category "police investigations." In some embodiments, the plurality of categories may not match exactly with the aspects of subject matter. For example, the clustering algorithm may group keywords associated with police investigations under "investigation." In these cases, control circuitry 604 may determine the category that is most similar to the aspect of subject matter. If the plurality of categories includes "investigation," "law," and "banks," control circuitry 604 may determine that "police investigations" is most similar to the category "investigation" because of the matching word "investigation."

At step 1410, control circuitry 604 (FIG. 6) identifies the first plurality of keywords in response to determining that a category associated with each of the first plurality of keywords corresponds to the aspect of subject matter. For example, the keywords categorized under the first category in the plurality of categories "investigations" may include "police," "robber," "clues," "questioning," and "witnesses." Because the category is associated with the first aspect of subject matter "police investigations," which corresponds to the first option, control circuitry 604 may identify the keywords associated with the first category as the first plurality of keywords.

At step 1412, control circuitry 604 (FIG. 6) searches the plurality of content sources for media content objects that include less than all of the first plurality of keywords and that are associated with a release time that precedes the first time. The release time is the time a media content object is transmitted by a content provider. For example, the content source may be CNN. The media content object may be a story segment on CNN News which is transmitted on CNN. Suppose that the first time control circuitry 604 receives a user selection of a first media content object is on Monday, Oct. 9, 2017. Control circuitry 604 may search for media content objects with release times before the first time on the Internet or databases of stored media from the content provider. For example, control circuitry 604 may retrieve previous news stories related to the bank robbery from the CNN News website (e.g., news story about suspicious activities near the bank a few days before the robbery). Accordingly, each media content object with a release time that precedes the first time will be analyzed by control circuitry 604 (e.g., extract keywords, determine that the media content object shares common subject matter with the first media content object). In particular, control circuitry 604 may determine whether the keywords associated with the identified media content object includes an amount of the first plurality of keywords less than the threshold.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 14.

Figure 15:
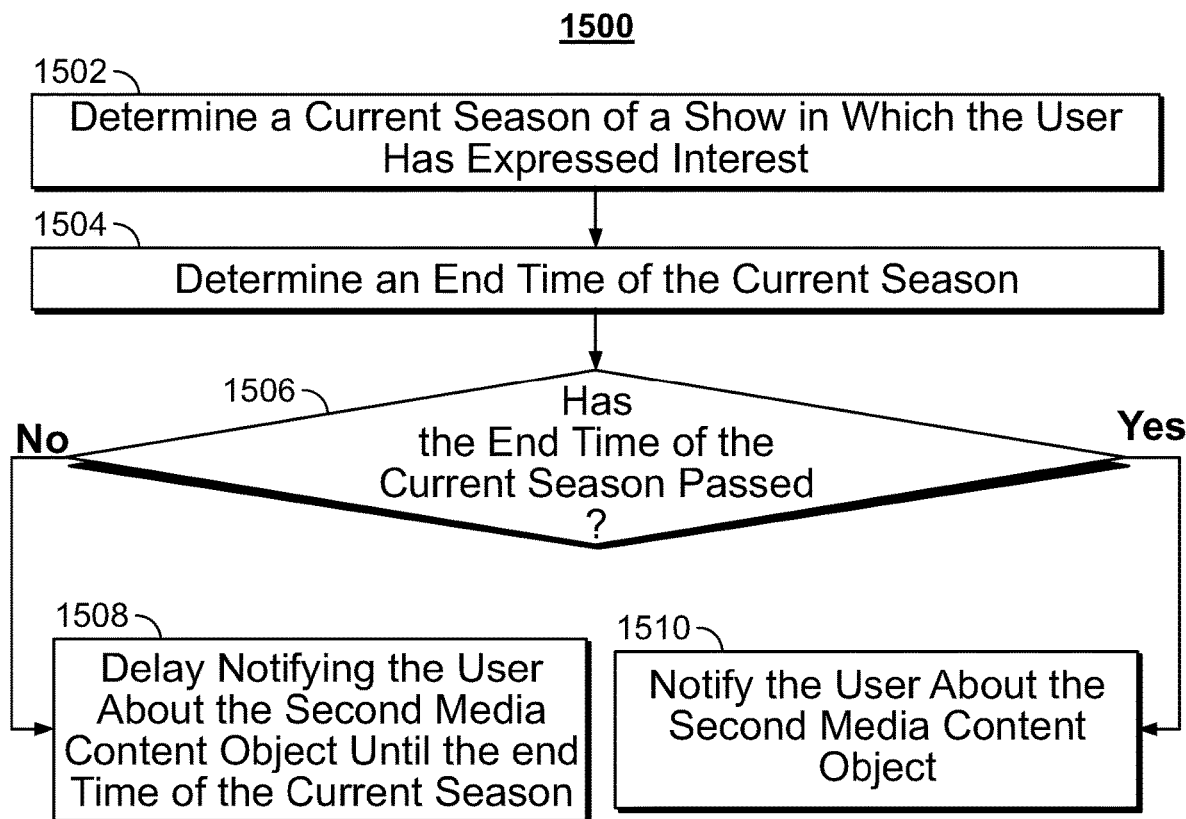
FIG. 15 is a flowchart of a detailed illustrative process for delaying notifying the user about the second media content object until the end time of a current season, in accordance with some embodiments of the disclosure.

FIG. 15 is a flowchart of illustrative steps of a process 1500 for delaying notifying the user about the second media content object until the end time of a current season, in accordance with some embodiments of the disclosure. It should be noted that process 1500 or any step thereof could be performed on, or provided by, any of the devices shown in FIGS. 6-7. For example, process 1500 may be executed by control circuitry 604 (FIG. 6) as instructed by a media guidance application implemented on a user device (e.g., user equipment devices 702, 704, and/or 706 (FIG. 7)) in order to delay notifying the user about the second media content object until the end time of a current season. In addition, one or more steps of process 1500 may be incorporated into or combined with one or more steps of any other process or embodiment (e.g., as described in relation to FIGS. 1-2, 8-14, and 16).

At step 1502, control circuitry 604 (FIG. 6) determines a current season of a show in which the user has expressed interest. Control circuitry 604 may retrieve the user profile in storage 608 which may include the user's viewing history. Suppose that the user watches "Game of Thrones." Control circuitry 604 may determine that the user is watching episodes from season 8, the current season, from the viewing history.

At step 1504, control circuitry 604 (FIG. 6) determines an end time of the current season. For example, control circuitry 604 may retrieve metadata associated with each episode that indicates the total number of episodes in a season (e.g., episode 8 of 10). If the show is transmitted weekly, control circuitry 604 may determine that two episodes remain to be transmitted and therefore the season will end in two weeks. Control circuitry 604 may also pull information, such as the broadcast schedule of the current season, from the Internet (e.g., IMDB episode list). The same process can be applied to sports season (e.g., schedule of games).

At step 1506, based on the retrieved information, control circuitry 604 (FIG. 6) determines whether the end time of the current season has passed. For example, control circuitry 604 may determine that the current date is Oct. 1, 2017 and the season's end time was Sep. 15, 2017.

At step 1508, in response to determining that the end time of the current season has not passed, control circuitry 604 delays notifying the user about the second media content object until the end time of the current season. For example, the end time of the current season may be two weeks away. In response, control circuitry 604 may delay notifying the user until two weeks have passed. In response to determining that the end time of the current season has passed, control circuitry 604 notifies the user about the second media content object at step 1510. As mentioned previously (e.g., FIG. 13 description), the notification generated by control circuitry 604 may be based on an alert type associated with the type of update (e.g., police investigations).

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 15.

Figure 16:
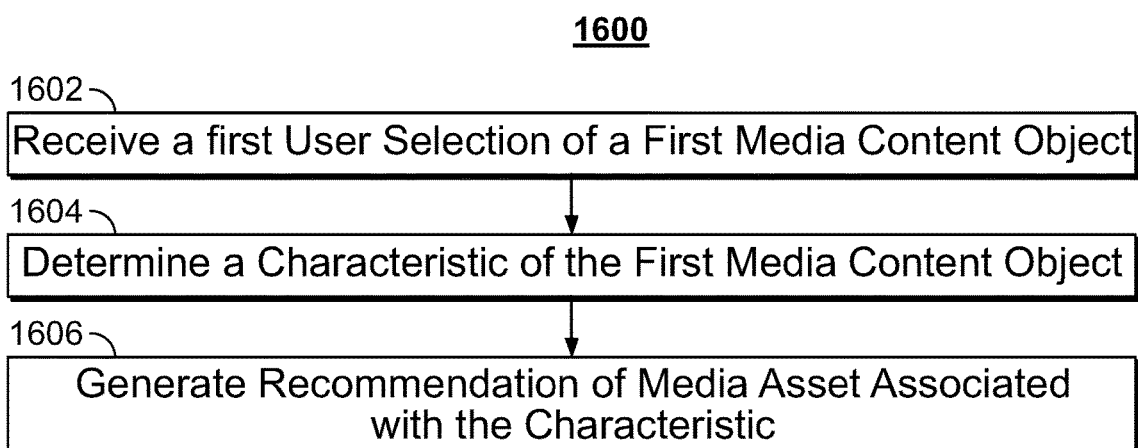
FIG. 16 is a flowchart of a detailed illustrative process for generating a recommendation of a media asset associated with a characteristic of the first media content object, in accordance with some embodiments of the disclosure.

FIG. 16 is a flowchart of illustrative steps of a process 1600 for generating a recommendation of a media asset associated with a characteristic of the first media content object, in accordance with some embodiments of the disclosure. It should be noted that process 1600 or any step thereof could be performed on, or provided by, any of the devices shown in FIGS. 6-7. For example, process 1600 may be executed by control circuitry 604 (FIG. 6) as instructed by a media guidance application implemented on a user device (e.g., user equipment devices 702, 704, and/or 706 (FIG. 7)) in order to generate a recommendation of a media asset associated with a characteristic of the first media content object. In addition, one or more steps of process 1600 may be incorporated into or combined with one or more steps of any other process or embodiment (e.g., as described in relation to FIGS. 1-2 and 8-15).

At step 1602, control circuitry 604 (FIG. 6) receives a first user selection of a first media content object. Continuing from the previous example, suppose that the user is viewing a news report on CNN News about a bank robbery in New York City. Control circuitry 604 may allow the user to tag (i.e., select) the story through a user input interface 610 on display 612. Based on his/her interest, the user may end up tagging the story. Control circuitry 604 may receive a selection associated with the first media content object (e.g., video clip of the news story) via I/O Path 602.

At step 1604, control circuitry 604 (FIG. 6) determines a characteristic of the first media content object. For example, control circuitry 604 may extract metadata from the first media content object, or retrieve the metadata from the media guidance data source 718 (FIG. 7). The metadata may include information about the first media content object, such as time of transmission, title, media type, description, content provider, and genre. Control circuitry 604 may choose one of these information types and identify the information type as a characteristic. For example, the first media content object may be a news update about a sports team. Therefore, control circuitry 604 may retrieve the genre and description from the metadata (e.g., sports news about New York Yankees) and determine a characteristic of the first media content object such as "sports news" or "New York Yankees."

At step 1606, control circuitry 604 (FIG. 6) generates a recommendation of a media asset associated with the characteristic. Suppose that the characteristic determined by control circuitry 604 is the description "New York Yankees." Control circuitry 604 may monitor the media content source 716 (FIG. 7) for content associated with the "New York Yankees" by analyzing the metadata associated with any detected media content for descriptions mentioning "New York Yankees." Thus, if the user selected a media content object about a sports news story involving the New York Yankees, control circuitry 604 may recommend a baseball match featuring the New York Yankees.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 6-7 could be used to perform one or more of the steps in FIG. 16.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   detecting an access to a first media content item by a user device;
   determining if a particular amount of time has elapsed since a release time of the first media content item;
   in response to the determining that the particular amount of time has elapsed, monitoring at least one database for related media content items; and
   identifying a second media content item related to the first media content item, wherein
   identifying the second media content item related to the first media content item comprises:
   extracting a first set of keywords from the first media content item;
   extracting a second set of keywords from the second media content item;
   identifying the second media content item based on determining that the first set of keywords and the second set of keywords have common keywords and that a number of the common keywords is below a particular limit; and
   generating for display a link to the second media content item.

2. The method of claim 1, wherein the first media content item is a first news story.

3. The method of claim 2, wherein the identifying the second media content item related to the first media content item comprises:
   identifying a second news story that is an update to the first news story.

4. The method of claim 2, further comprising:
   determining the particular amount of time based on a type of the first news story.

5. The method of claim 1, wherein identifying the second media content item comprises: determining that the number of common keywords between the first set of keywords and the second set of keywords is between an upper limit and a lower limit.

6. The method of claim 1, further comprising:
   generating for display a timeline that depicts:
   (a) a line,
   (b) a maker on the line that identifies the release time of the first media content item, and
   (c) a plurality of markers in the line that indicate types and release times of a plurality of additional identified media content items.

7. The method of claim 1, further comprising:
   generating for display a set of recommendations for alternative media content items based on a characteristic of the first media content item.

8. The method of claim 1, further comprising:
   generating for display a media playlist that includes the first media content item, the second media content item, and a plurality of additional identified media content items.

9. A system comprising:
   a control circuitry configured to:
   detect an access to a first media content item by a user device;
   determine if a particular amount of time has elapsed since a release time of the first media content item;
   in response to the determining that the particular amount of time has elapsed, monitor at least one database for related media content items; and
   identify a second media content item related to the first media content item, wherein identifying the second media content item related to the first media content item comprises the control circuitry further configured to:
   extract a first set of keywords from the first media content item;
   extract a second set of keywords from the second media content item;
   identify the second media content item based on determining that the first set of keywords and the second set of keywords have common keywords and that a number of the common keywords is below a particular limit; and
   an input/output circuitry configured to:
   generate for display a link to the second media content item.

10. The system of claim 9, wherein the first media content item is a first news story.

11. The system of claim 10, wherein the control circuitry is configured to identify the second media content item related to the first media content item by:
    identifying a second news story that is an update to the first news story.

12. The system of claim 10, where the control circuitry is configured to determine the particular amount of time based on a type of the first news story.

13. The system of claim 9, where the control circuitry is configured to identify the second media content item by:
    determining that the number of common keywords between the first set of keywords and the second set of keywords is between an upper and lower limit.

14. The system of claim 9, wherein the input/output is configured to generate for display a timeline comprising:
    (a) a line,
    (b) a marker on the line that identifies the release time of the first media content item,
    (c) a plurality of markers in the line that indicate types and release times of a plurality of additional identified media content items.

15. The system of claim 9, wherein the input/output is configured to generate a display of recommendations for alternative media content items based on a characteristic of the first media content item.

16. The system of claim 9, wherein the input/output is configured to generate a display of a media playlist that includes the first media content item, the second media content item, a plurality of additional identified media content items.

17. A system comprising:
    means for detecting an access to a first media content item by a user device;
    means for determining if a particular amount of time has elapsed since a release time of the first media content item;
    means for monitoring at least one database for related media content items in response to determining that the particular amount of time has elapsed;
    means for identifying a second media content item related to the first media content item, which comprises:
    extracting a first set of keywords from the first media content item,
    extracting a second set of keywords from the second media content item, identifying the second media content item based on determining that the first set of keywords and the second set of keywords have common keywords and that a number of the common keywords is below a particular limit; and means for generating for display a link to the second media content item.

18. The system of claim 17, wherein the means for identifying the second media content item related to the first media content item comprise means for:

identifying a second news story that is an update to the first news story.

19. The system of claim 18, further comprises means for identifying the second media content item as an update to the first news story.

20. The system of claim 18, further comprising means for determining the particular amount of time based on a type of the first news story.

* * * * *